US012576705B2

(12) United States Patent (10) Patent No.: US 12,576,705 B2
Guo (45) Date of Patent: Mar. 17, 2026

(54) BATTERY PACK AND VEHICLE

(71) Applicant: HONDA MOTOR CO., LTD., Tokyo (JP)

(72) Inventor: Chuyun Guo, Guangdong (CN)

(73) Assignee: HONDA MOTOR CO., LTD., Tokyo (JP)

( * ) Notice: Subject to any disclaimer, the term of this patent is extended or adjusted under 35 U.S.C. 154(b) by 287 days.

(21) Appl. No.: 18/226,800

(22) Filed: Jul. 27, 2023

(65) Prior Publication Data

US 2024/0042843 A1 Feb. 8, 2024

(30) Foreign Application Priority Data

Aug. 4, 2022 (CN) .......................... 202210935508.5

(51) Int. Cl.
B60K 1/04 (2019.01)
B60K 1/02 (2006.01)
(Continued)

(52) U.S. Cl.
CPC .................. B60K 1/04 (2013.01); B60K 1/02 (2013.01); H01M 10/425 (2013.01); H01M 50/209 (2021.01); H01M 50/249 (2021.01); H01M 50/262 (2021.01); H01M 50/51 (2021.01); B60K 2001/0438 (2013.01); B60L 50/64 (2019.02); H01M 2010/4271 (2013.01); H01M 2220/20 (2013.01)

(58) Field of Classification Search
CPC .... B60K 1/02; B60K 1/04; B60K 2001/0438; B60L 50/64; H01M 10/425; H01M 50/209; H01M 50/249; H01M 50/262; H01M 50/51; H01M 50/204; H01M 50/296; H01M 50/244; H01M 50/50; H01M 2010/4271; H01M 2220/20
See application file for complete search history.

(56) References Cited

U.S. PATENT DOCUMENTS

2018/0009331 A1* 1/2018 Huang ................ H01M 10/482
2018/0342892 A1* 11/2018 Zhou ................... H01M 10/441
(Continued)

FOREIGN PATENT DOCUMENTS

CN 109494330 A * 3/2019 .......... H01M 50/572
CN 113043823 A * 6/2021 .............. B60K 1/04
(Continued)

*Primary Examiner* — Timothy Hannon
(74) *Attorney, Agent, or Firm* — Amin, Turocy & Watson, LLP

(57) ABSTRACT

A battery pack and a vehicle that can improve operational convenience are provided in the present invention. The battery pack includes a housing, wherein the front and rear ends of the housing are respectively equipped with a first connector and a second connector; a battery module configured within the housing, including a first battery module and a second battery module, with a gap configured between the first battery module and the second battery module; and a power distribution device electrically connected to the first connector and the battery module, and electrically connected to the second connector and the battery module. The power distribution device is arranged above the first battery module or the second battery module, and is closer to the second connector than the first connector.

9 Claims, 28 Drawing Sheets

(51) Int. Cl.

| | | |
|---|---|---|
| *H01M 10/42* | (2006.01) | |
| *H01M 50/209* | (2021.01) | |
| *H01M 50/249* | (2021.01) | |
| *H01M 50/262* | (2021.01) | |
| *H01M 50/51* | (2021.01) | |
| *B60L 50/64* | (2019.01) | |

(56) References Cited

U.S. PATENT DOCUMENTS

| | | | |
|---|---|---|---|
| 2020/0152946 A1* | 5/2020 | Burkman | H01M 50/505 |
| 2022/0149458 A1* | 5/2022 | Jiang | H01M 10/657 |
| 2024/0153674 A1* | 5/2024 | Archer | B60L 53/16 |
| 2025/0018804 A1* | 1/2025 | Suzuki | B60L 15/007 |
| 2025/0019021 A1* | 1/2025 | Becirbasic | B62D 21/10 |
| 2025/0141225 A1* | 5/2025 | Sorani | H01M 50/258 |

FOREIGN PATENT DOCUMENTS

| | | | | |
|---|---|---|---|---|
| CN | 115312932 A | * | 11/2022 | H01M 10/6554 |
| KR | 20230050558 A | * | 4/2023 | H01M 50/209 |

* cited by examiner

FRONT

LEFT ← → RIGHT

BACK

FIG. 13

UP
RIGHT   BACK
FRONT   LEFT
DOWN

BATTERY PACK AND VEHICLE

CROSS-REFERENCE TO RELATED APPLICATION

Priority is claimed on Chinese Patent Application No. 202210935508.5, filed on Aug. 4, 2022, the contents of which are incorporated herein by reference.

BACKGROUND OF THE INVENTION

Field of the Invention

The present invention relates to a battery pack and a vehicle.

Description of Related Art

A power distribution device (also called a power distribution case or power distribution box) is an important part of a battery pack of an electric vehicle for transferring or transmitting electrical energy to the motor, etc. For the installation of a power distribution device, there is a structure in which a plurality of battery modules in the middle of the front and back directions jointly support a bracket on which the power distribution device is mounted.

However, this structure has the power distribution device configured in the middle of the front and back directions of the battery pack, and thus, when performing operations such as maintenance, repair or replacement of the power distribution device, it is necessary to operate over the plurality of battery modules, making it inconvenient for maintenance personnel.

SUMMARY OF THE INVENTION

The present invention provides a battery pack and a vehicle capable of improving operational convenience.

A first aspect of the present invention provides a battery pack comprising: a housing, said housing being provided with a first connector and a second connector at the front and rear ends, respectively; a battery module configured within said housing comprising a first battery module and a second battery module, said first battery module being configured to be spaced apart from said second battery module by a gap; and a power distribution device electrically connected to said first connector and said battery module and electrically connected to said second connector and said battery module, said power distribution device being provided above said first battery module or said second battery module and being provided closer to said second connector than to said first connector. That is, the distance from the power distribution device to the second connector is less than the distance to the first connector and is set closer to the second connector.

With the above structure, the power distribution device is configured closer to the second connector located at the front and rear ends of the housing, thereby enabling the operator to easily operate the power distribution device when it is serviced, repaired, or replaced, and improving the ease of operation for operations such as servicing. In addition, the wiring length between the power distribution device and the second connector can be reduced, and the cost can be reduced.

In addition, by setting the power distribution device above the first battery module or the second battery module, for example, compared with a structure in which the power distribution device is set above both the first battery module and the second battery module, it is not necessary to install the power distribution device across the gap, thereby improving not only the ease of installation of the power distribution device but also the stability of the power distribution device, reducing the overall space occupied by the power distribution device, and increasing the energy density of the battery pack. In addition, for example, compared with the structure in which the power distribution device is configured in the gap between the battery modules, it is possible to suppress the increase in the width of the battery pack and facilitate the miniaturization of the battery pack.

In the above structure, the first connector can be configured at the front end of the housing or at the rear end of the housing; accordingly, the second connector can be configured at the rear end of the housing or at the front end of the housing.

In the case where the second connector is configured at the rear end of the housing, the power distribution device is provided close to the second connector, so that a recess for accommodating the power distribution device is provided at the rear part of the housing of the battery pack, and the recess is raised when viewed from the outside, so that the front part of the housing of the battery pack does not have a large projection, and thus there is more space in the cabin corresponding to the position of the battery pack for placing passengers' feet.

As a possible embodiment of the first aspect, said power distribution device is fixed to said first battery module or said battery pack by means of a power distribution device bracket.

With the above structure, the power distribution device is mounted on the battery module by means of the power distribution device bracket, which can enhance the stability of the power distribution device.

As a possible implementation of the first aspect, said power distribution device bracket comprises a top part and a side part, said side part being bent from an edge of said top part, said top part and said side part being fit well to an upper surface and a side surface of one of said first battery module and said second battery module, respectively.

With the above structure, the power distribution device bracket is provided with the top part and side parts which fit the battery module well, thus not only improving the contact area between the power distribution device bracket and the battery module, making the power distribution device bracket firm and reliable, and thus making the position of the power distribution device stable and reliable, but also reducing the space occupied by the power distribution device bracket and the power distribution device as a whole, making the structure more compact and facilitating the miniaturization of the battery pack.

As a possible implementation of the first aspect, said power distribution device bracket has a first mounting hole and said battery module has a second mounting hole. A first bolt passes through said first mounting hole and said second mounting hole in sequence, such that said power distribution device bracket and said battery module are fixed to the housing.

Using the above structure, the power distribution device is fixed to the housing by the first mounting hole, which can enhance the stability of the power distribution device bracket and facilitate installation. In addition, by using the mounting structure of the battery module (the first bolt, the mounting part on the housing, etc.) to mount the power distribution device, on the one hand, there is no need to set up a specialized structure for mounting the power distribution device on the battery module or the housing, thus simplifying the structure and reducing the cost, and also facilitating the miniaturization of the battery pack; on the other hand, the installation of the power distribution device and the installation of individual battery modules are the same operation process, thus reducing the installation time and improving the efficiency of the battery pack installation.

Furthermore, since the power distribution device is fixed by using a structure that fixes the battery module to the housing, it is not necessary to change the structure of the battery module, and it is sufficient to use a universal battery module, which does not require special treatment and is easy to manage.

As a possible implementation of the first aspect, a second bolt is fixed on the upper surface of said top part, and said power distribution device is mounted on said power distribution device bracket by said second bolt.

With the above structure, the second bolt is provided on the upper surface of the top part of the power distribution device bracket, i.e., the nut that fits with this second bolt is provided on the power distribution device, and compared with the structure in which the nut is configured on the power distribution device bracket, the lower surface of the power distribution device bracket does not need a space for setting the nut, etc., thereby enabling the top part of the power distribution device bracket to fit the battery module well, and making it easy to achieve a compact structure, etc.

As a possible implementation of the first aspect, said first battery module and said second battery module connected in series are electrically connected to said power distribution device. Said power distribution device is provided with a first wiring terminal and a second wiring terminal, said first wiring terminal is electrically connected to said first connector via a first high-voltage connection component, and said second wiring terminal is electrically connected to said second connector via a second high-voltage connection component.

The first high-voltage connection component may be configured in the base plate of the housing to reduce the risk of being impacted or crushed by the battery module. In this case, the second high-voltage connection component connecting the power distribution device and the second connector is shorter because the power distribution device is close to the second connector, and thus can be less susceptible to impact or crushing by the battery module even without being set in the base plate. In this way, only one of the first high-voltage connection component and the second high-voltage connection component needs to be installed in the base plate, and the other does not need to be installed in the base plate, thus reducing installation time. It can be seen that the technical effect of reducing the installation time can also be obtained by configuring the power distribution device at a position close to the second connector.

As a possible implementation of the first aspect, said battery module comprises a plurality of first battery modules and a plurality of said second battery modules arranged in front and back directions, respectively, and said power distribution device is mounted on a single said first battery module or a single said second battery module which is closest to said second connector. Here, for example, in the case where the second connector is provided at the rear end of the housing, the single said first battery module or the single said second battery module closest to said second connector is the rearmost single first battery module or single second battery module.

As a possible implementation of the first aspect, the battery pack further comprises a low-voltage connection component electrically connected to said battery modules, and said low-voltage connection component is configured in said gap.

A second aspect of the present invention provides a vehicle comprising a battery pack of any of the structures in the first aspect. Further, the vehicle may include a first motor and a second motor. Said first motor is configured in front of said battery pack and electrically connected to said first connector, and said second motor is configured in the rear of said battery pack and electrically connected to said second connector. Said second connector is provided at a rear end of said housing.

By using the vehicle of the second aspect, the same technical effect as in the first aspect can be obtained and will not be repeatedly described here.

BRIEF DESCRIPTION OF THE DRAWINGS

The various features of the present invention and the connection between the various features are further described below with reference to the accompanying drawings. The accompanying drawings are exemplary, some features are not shown to actual scale, and some of the accompanying drawings may omit features that are customary in the field covered by this application and are not essential to this application, or additionally show features that are not essential to this application. The combination of features shown is not intended to limit the present application. In addition, throughout this specification, the same appended markings are the same. The specific accompanying drawings are illustrated as follows:

FIG. 13 is another cross-sectional schematic diagram of the structure in FIG. 6;

FIG. 15b is a partial cross-sectional schematic diagram of the base plate in FIG. 15a;

FIG. 21b is a partially enlarged view of the structure illustrated in FIG. 21a;

FIG. 21c is another partially enlarged view of the structure illustrated in FIG. 21a;

FIG. 21d is another partial enlargement of the structure illustrated in FIG. 21a;

FIG. 22b is a schematic top view of the structure in FIG. 22a;

BRIEF DESCRIPTION OF THE REFERENCE SYMBOLS

10, housing; 11, base plate; 11a, protrusion; 12, side plate; 13, upper cover; 14, lugs; 15, window plate; 16d, bolt; 16e, nut; 20, battery module; 20a, main part; 20b, mounting hole; 20c, wiring terminal; 20L, battery module; 20R, battery module; 21, bolt (first bolt); 22, nut; 31, power distribution device; 31a, mounting hole; 31b, wiring terminal; 31c, wiring terminal; 31d, wiring terminal; 32, power distribution device bracket; 32a, mounting hole; 33, bolt (second bolt); 34, nut; 41, control device; 42, control device bracket; 42a, main part; 42b, base part; 42c, harness fixing portion; 44, ring bracket; 50, high-voltage connection component (an example of the first high-voltage connection component, electrical connection component); 51, high-voltage harness (an example of a wire harness); 51a, conductive component; 51b, cladding layer; 51c, protrusion; 52, connector; 53, connector; 55, high-voltage connection component (an example of a second high-voltage connection component); 58, wiring terminal; 60, low-voltage connection component; 61, low-voltage harness (an example of a wire harness); 62, low-voltage harness bracket; 63, ring bracket; 64, ring bracket; 65, connector; 66, connector; 70, reinforcing component; 71, first connection component; 72, reinforcing member; 72a, arch portion; 72b, vertical portion; 72c, fixing portion; 72d, groove; 72e, opening; 73, second connection component; 100, battery pack; 101, connection port; 102, connection port; 111, plate; 112, high-voltage harness bracket; 112a, main part; 112b, raised part; 113, holding portion; 114, snap portion; 115, coolant channel; 116, plate; 116a, opening; 118, plate; 200, vehicle; 201, wheel; 202, wheel; 203, wheel; 204, wheel; 210, motor (an example of a first motor); 220, motor (an example of a second motor); 321, top part; 321a, reinforcing rib; 322, side part; 611, main wire portion; 612, branch wire portion; 621, main part; 623, wire harness fixing portion.

DETAILED DESCRIPTION OF THE INVENTION

Some embodiments of the present invention are described in detail below with reference to the accompanying drawings. In the following description, the directions are defined in terms of the driver. However, these directions are defined for ease of description and are not limitations of the invention. In addition, these directions are also indicated in some of the accompanying drawings.

Figure 2:
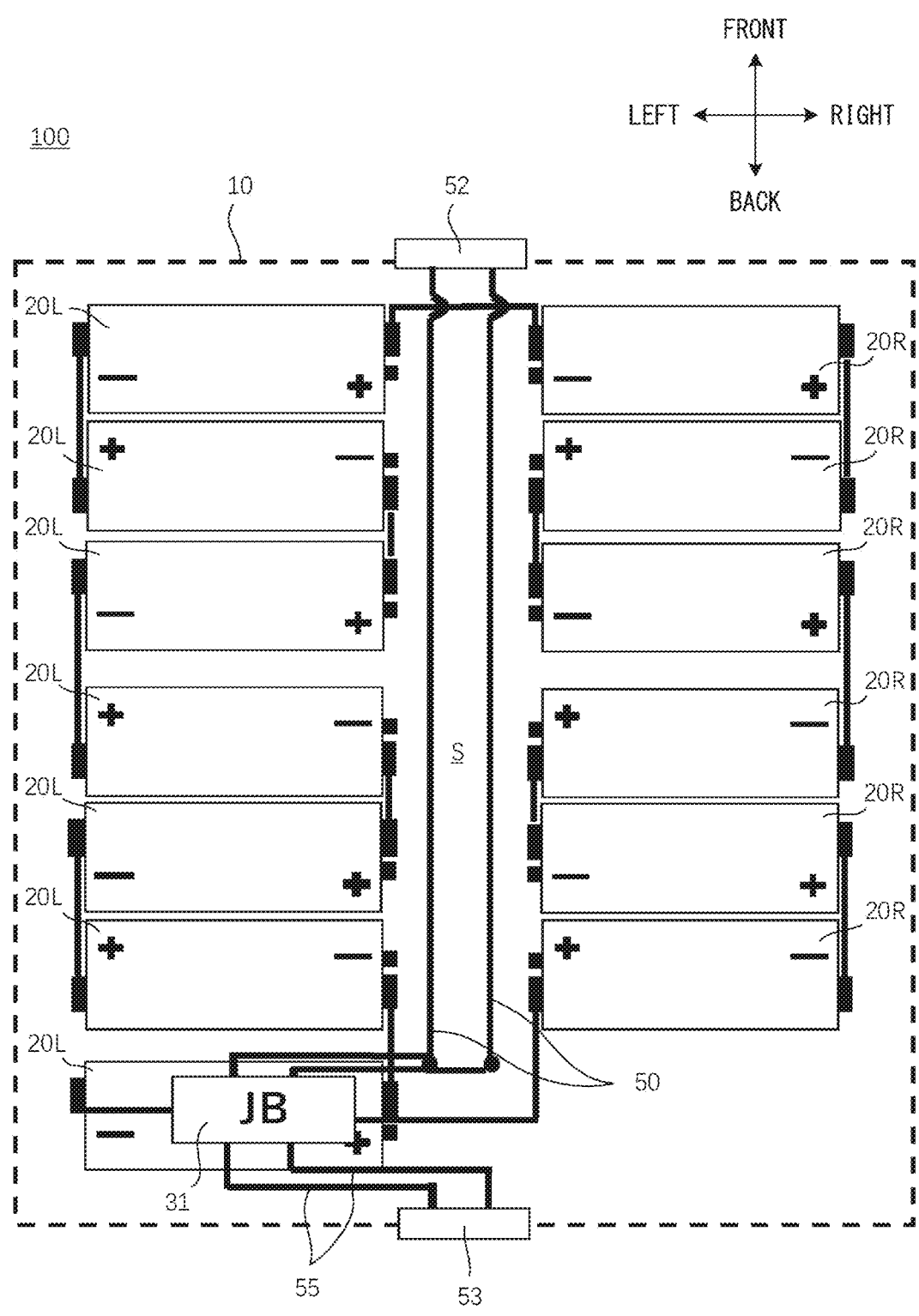
FIG. 2 is a schematic diagram of the principle of a battery pack involved in an embodiment of the present invention.
Figure 5:
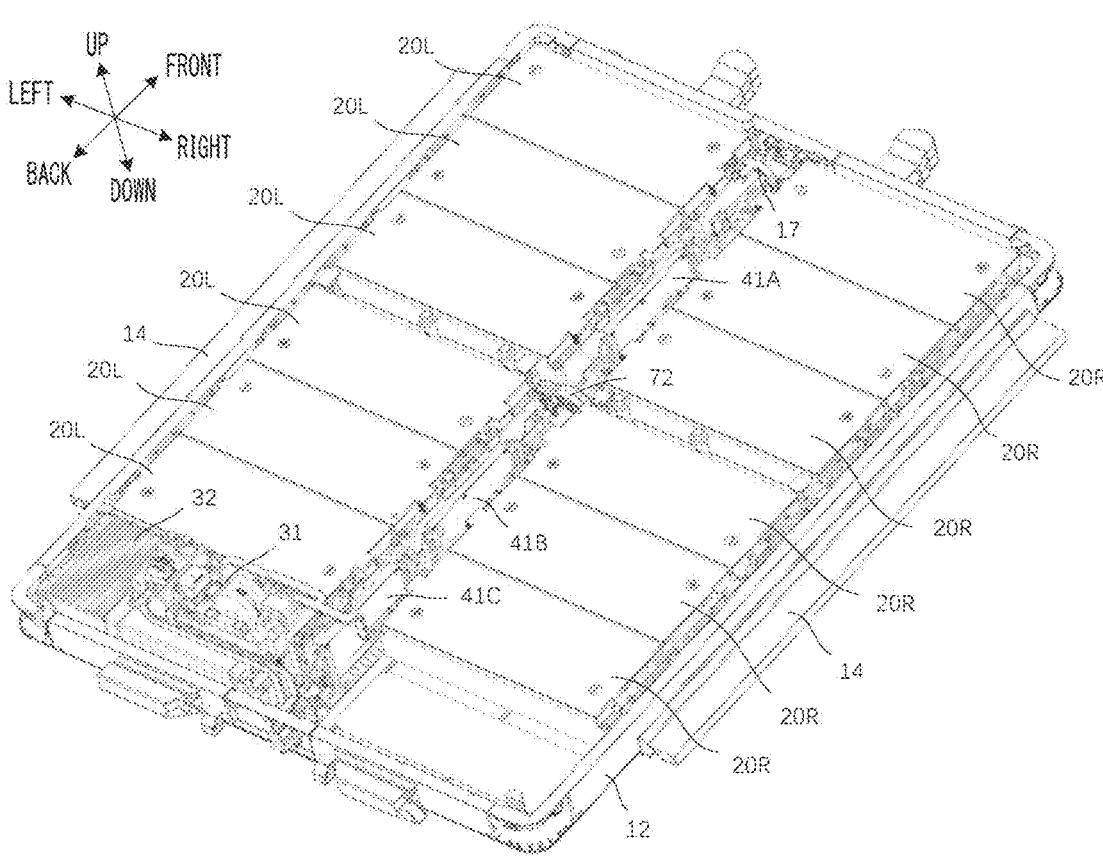
FIG. 5 is a schematic diagram of the three-dimensional structure of the battery pack of FIG. 4 in a state with the top cover removed.
Figure 6:
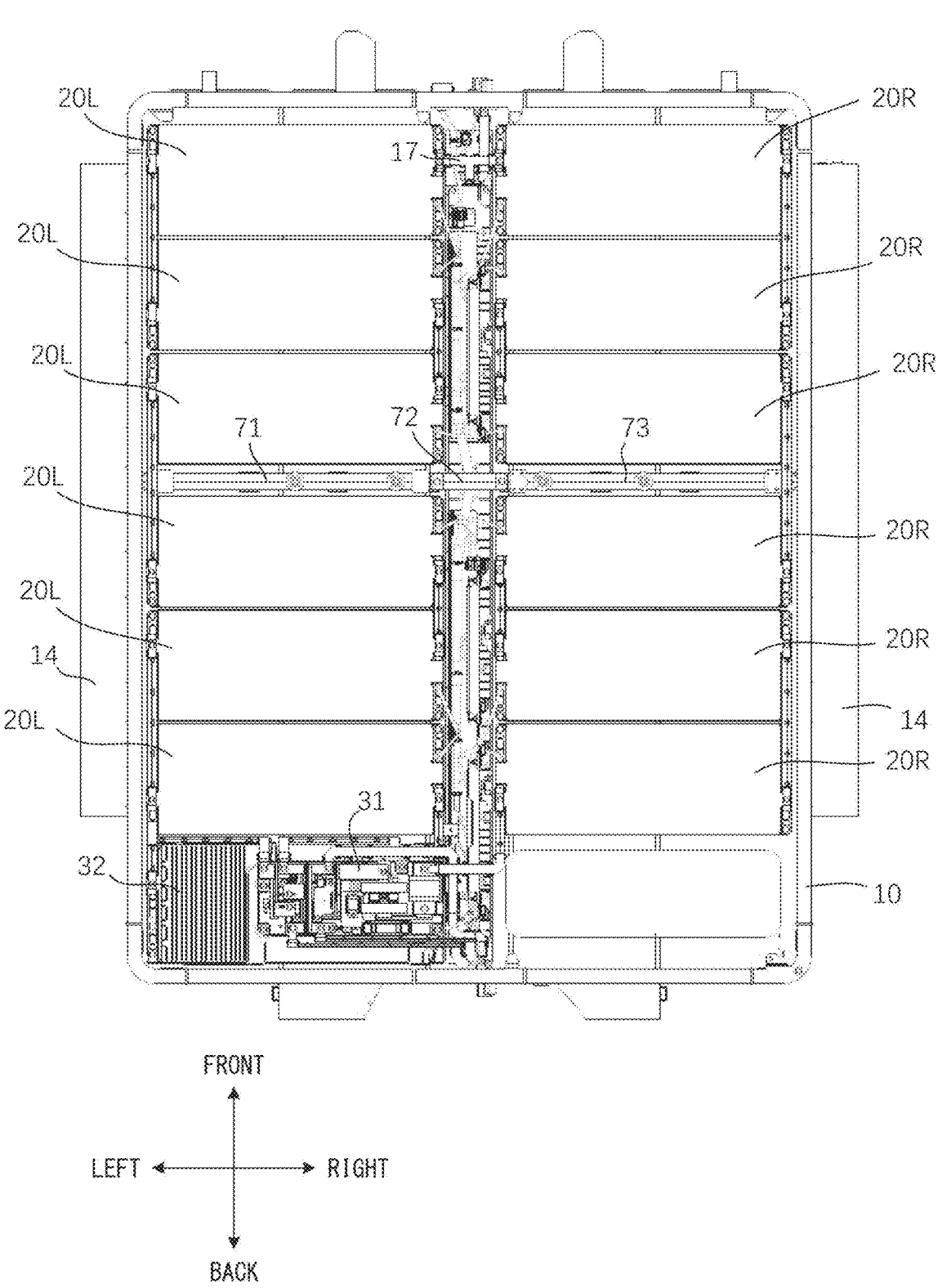
FIG. 6 is a schematic diagram of the structure of the battery pack of FIG. 4 in a top view with the top cover removed.

As shown in FIG. 2, one embodiment of the present invention provides a battery pack 100 comprising a housing 10, battery modules 20L, 20R (collectively referred to as a battery module 20), and a power distribution device 31. A connector 52 and a connector 53 are provided at the front and rear ends of housing 10, respectively. The connector 52 and the connector 53 are used to electrically connect to external electrical devices of the battery pack 100 (e.g., electrically to a motor 210 and a motor 220 that will be described later) and to transmit electrical energy from the battery pack 100 to the external electrical device. The battery module 20 is configured within the housing 10 and includes battery modules 20L and battery modules 20R, with the gap S configured between them. In the example shown in FIG. 2, battery modules 20L and battery modules 20R are configured opposite to each other in the left and right directions. The power distribution device 31 is electrically connected to the connector 52 and the plurality of battery modules 20, and to the connector 53 and the plurality of battery modules 20. Referring to FIG. 2, FIG. 5, FIG. 6, etc., the power distribution device 31 is disposed on one of the battery modules 20L and the battery modules 20R, i.e., the power distribution device 31 is disposed on the battery module 20L, and is disposed closer to the connector 53 than to the connector 52. As other embodiments, the power distribution device 31 may also be mounted on the battery module 20R.

With the above structure, the power distribution device 31 is configured closer to the connector 53 located at the front and rear ends of the housing, thereby enabling an operator to easily operate the power distribution device 31 when it is serviced, repaired or replaced, improving the ease of operation for operations such as servicing. In addition, it is possible to reduce the length of the wiring between the power distribution device 31 and the connector 53, which can reduce costs.

Alternatively, setting the power distribution device 31 above the battery modules 20L or battery modules 20R, for example, is different from setting the power distribution device 31 above both of the battery modules 20L and battery modules 20R. Because the power distribution device 31 does not have to be installed across the gap S, not only is the convenience of installing the power distribution device 31 improved, but also the stability of the power distribution device 31 is improved, the overall space occupied by the power distribution device 31 is reduced, and the energy density of the battery pack is increased. In addition, for example, compared with the structure in which the power distribution device 31 is configured in the gap between the battery modules 20, the increase in the width of the battery pack can be suppressed, which facilitates the miniaturization of the battery pack.

In the example shown in FIG. 2, the power distribution device 31 is configured close to the connector 53 located on the rear side. However, the present invention is not limited to this, and it can also be configured close to the connector 52 located on the front side.

With the above structure, the power distribution device 31 is configured close to the connectors located at the front and rear ends of the housing 10, such that, for example, compared to when the power distribution device 31 is configured in the middle of the front and back directions, the operator can easily operate the power distribution device 31 when it is serviced, repaired or replaced, and the ease of operation for operations such as servicing is improved. In addition, the wiring length between the power distribution device 31 and the connector 53 can be reduced, which can reduce costs.

In the case where the power distribution device 31 is configured near the connector 53 located at the rear side, a recess for accommodating the power distribution device 31 can be provided at the rear part of the housing 10 of the battery pack 100, which is a projection 13a from the outside (FIG. 4), so that there is no larger projection at the front part of the housing 10 of the battery pack 100, and when the battery pack 100 is mounted on the vehicle, it provides more space in the cabin corresponding to the battery pack 100 to accommodate the feet of passengers.

Figure 22A:
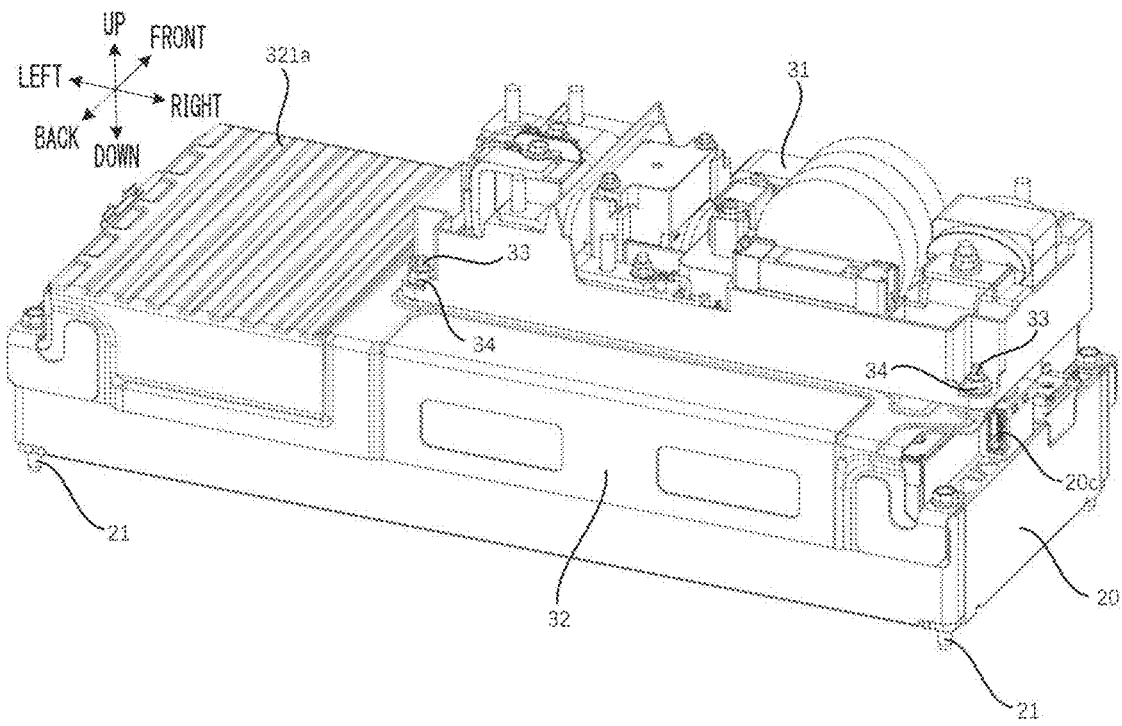
FIG. 22a is a diagram of the combined state of the battery module, the power distribution device bracket and the power distribution device involved in one embodiment of the present invention.

Optionally, in one embodiment, the power distribution device 31 is mounted on the battery pack 20L from above via the power distribution device bracket 32 as shown in FIG. 5 and FIG. 22a.

With the above structure, the power distribution device 31 is mounted on the battery module 20L through the power distribution device bracket 32, which enhances the stability of the power distribution device 31.

As an alternative embodiment, the power distribution device 31 can be mounted directly on the battery module 20L without the power distribution device bracket 32.

Figure 24:
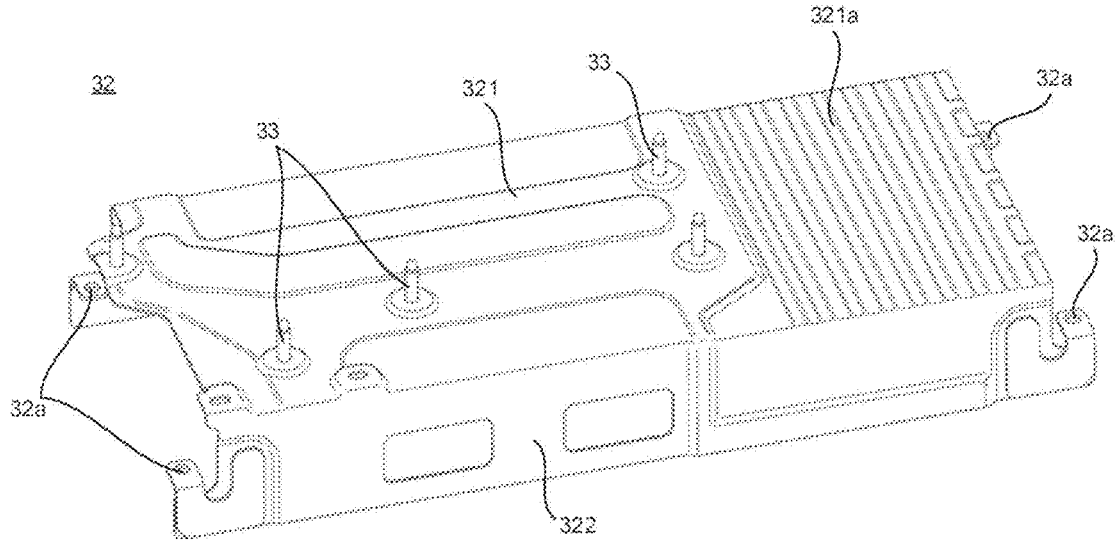
FIG. 24 is a schematic diagram of the three-dimensional structure of the power distribution device bracket involved in one embodiment of the present invention.

Optionally, in one embodiment, as shown in FIG. 22a and FIG. 24, the power distribution device bracket 32 includes a top part 321 and side parts 322, with the side parts 322 bent from the edges of the top part 321, and the top part 321 and the side parts 322 fit well the upper and side surfaces of the battery module 20L, respectively.

With the above structure, the top part 321 and the side parts 322 of the power distribution device bracket 32 fit top part and side parts 322 of the battery module 20L well, so that the contact area between the power distribution device bracket 32 and the battery module 20L can be increased, thereby allowing the power distribution device 31 to be arranged in a stable and reliable position. In addition, the space occupied by the power distribution device bracket 32 and the power distribution device 31 as a whole can be reduced, making the structure more compact and facilitating the miniaturization of the battery pack.

Figure 22B:
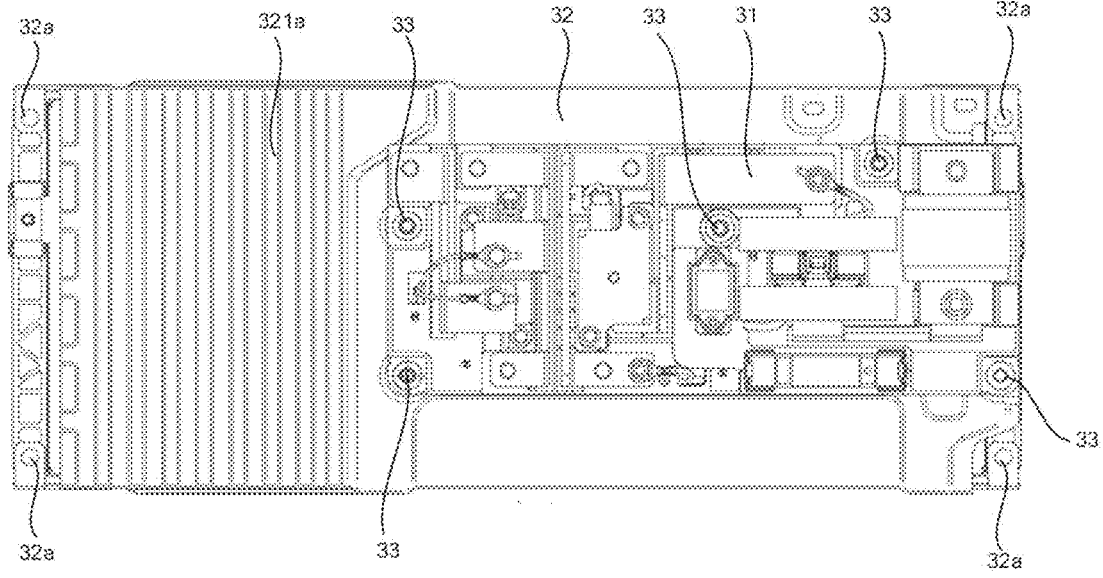
Figure 25:
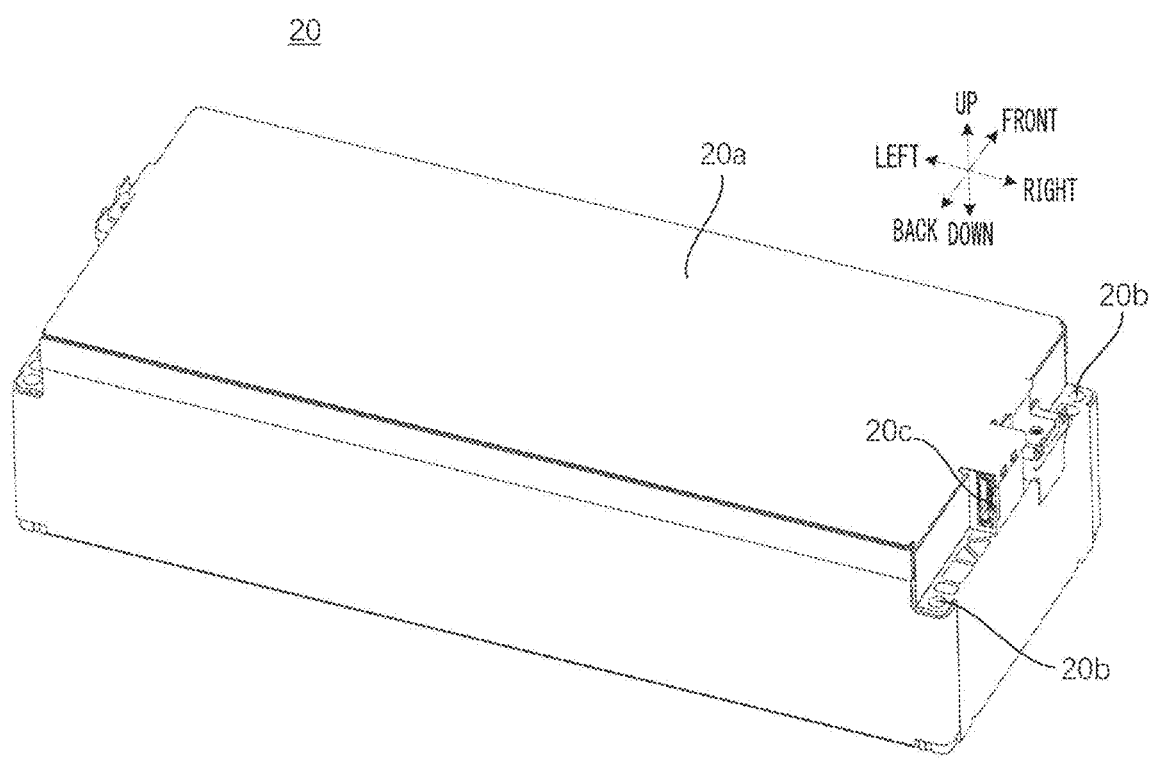
FIG. 25 is a schematic diagram of the three-dimensional structure of a battery module involved in an embodiment of the present invention.

Optionally, in one embodiment, the power distribution device bracket 32 has mounting holes 32a as shown in FIG. 22b, the battery module 20L has mounting holes 20b as shown in FIG. 25, and the bolt 21 passes through the installation holes 32a and 20b in sequence, so that the power distribution device bracket 32 and battery module 20L are fixed on the housing 10.

With the above structure, the power distribution device 31 is fixed to the housing 10 through the mounting holes 32a, which enhances the stability of the power distribution device bracket 32 and facilitates installation. In addition, by using the mounting structure of the battery module (bolts, a mounting portion on the housing, etc.) to mount the power distribution device 31, on the one hand, it is not necessary to have a separate structure on the battery module 20L or the housing 10 specifically for mounting the power distribution device 31, and thereby it is possible to simplify the structure, reduce the cost, and also facilitate the miniaturization of the battery pack; on the other hand, during the mounting operation, mounting of the distribution device 31 and mounting of the individual battery module 20L of the distribution device 31 are the same operation process, thus reducing the installation time and improving the efficiency of the battery pack installation operation.

In addition, due to the use of a structure that fixes the battery module 20L to the housing 10 to fix the power distribution device 31, it is not necessary to change the structure of the battery module 20L, and it is possible to use a common battery module without special treatment, which is easy to manage.

As other embodiments, instead of utilizing bolts 21 and mounting holes 20b, a separate mounting structure can be provided on the battery module 20L to mount the power distribution device 21. Further, the mounting form of the power distribution device 21 is not limited to the bolt, and it can also be mounted in other forms, such as welding, riveting, snapping, etc.

Optionally, in one embodiment, as shown in FIG. 22a, FIG. 22b, FIG. 23, and FIG. 24, the top part 321 has bolts 33 secured to its upper surface, and the power distribution device 31 is mounted on the power distribution device bracket 32 by the bolts 33.

Using the above structure, the bolts 33 are provided on the upper surface of the top part 321 of the power distribution device bracket 32, i.e., nuts 34, which fit the bolts 33, are provided on the power distribution device 31. Compared with the structure in which the nuts are set on the power distribution device bracket 32, the lower surface side of the power distribution device bracket 32 does not require a space for setting the nuts, etc., so that the top part 321 of the power distribution device bracket 32 fits to the battery module 20L well, making it easy to achieve a compact structure, etc.

It is understood that the specific form of the mounting structure of the power distribution device 31 is not limited to this example in the above embodiment in which the bolts 33 extending in the up and down directions are used to mount the power distribution device 31, and as other embodiments, bolts extending in the front and back directions or the left and right directions may also be used. Alternatively, snap fasteners may be used to achieve installation.

Figure 26:
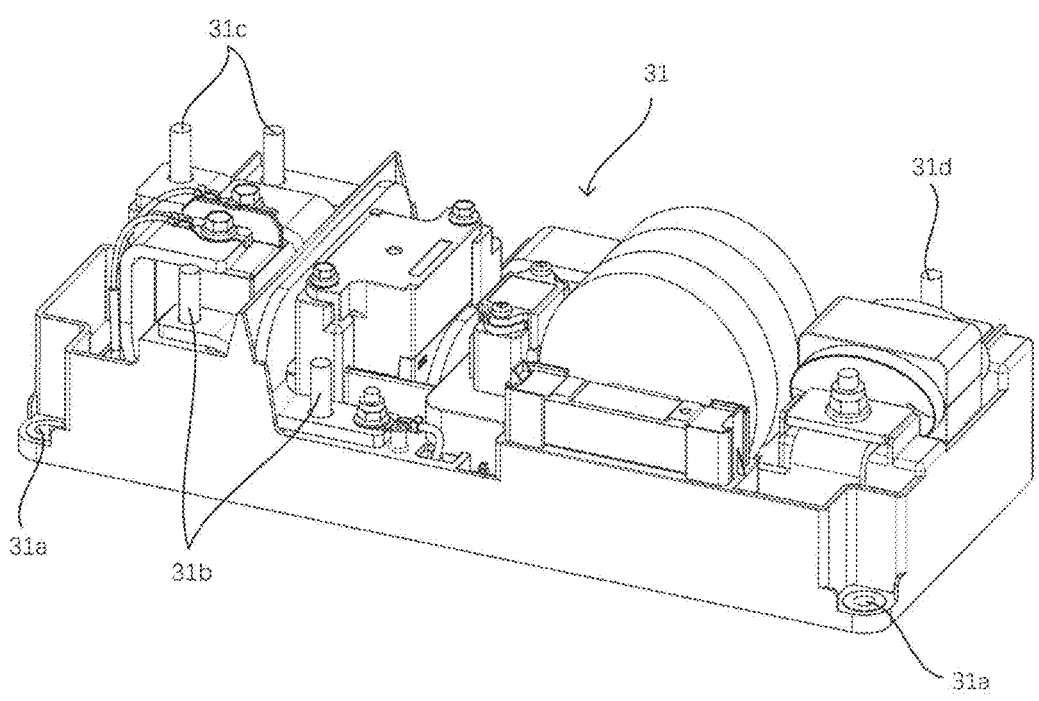
FIG. 26 is a schematic diagram of the three-dimensional structure of the power distribution device involved in an embodiment of the present invention.
Figure 27:
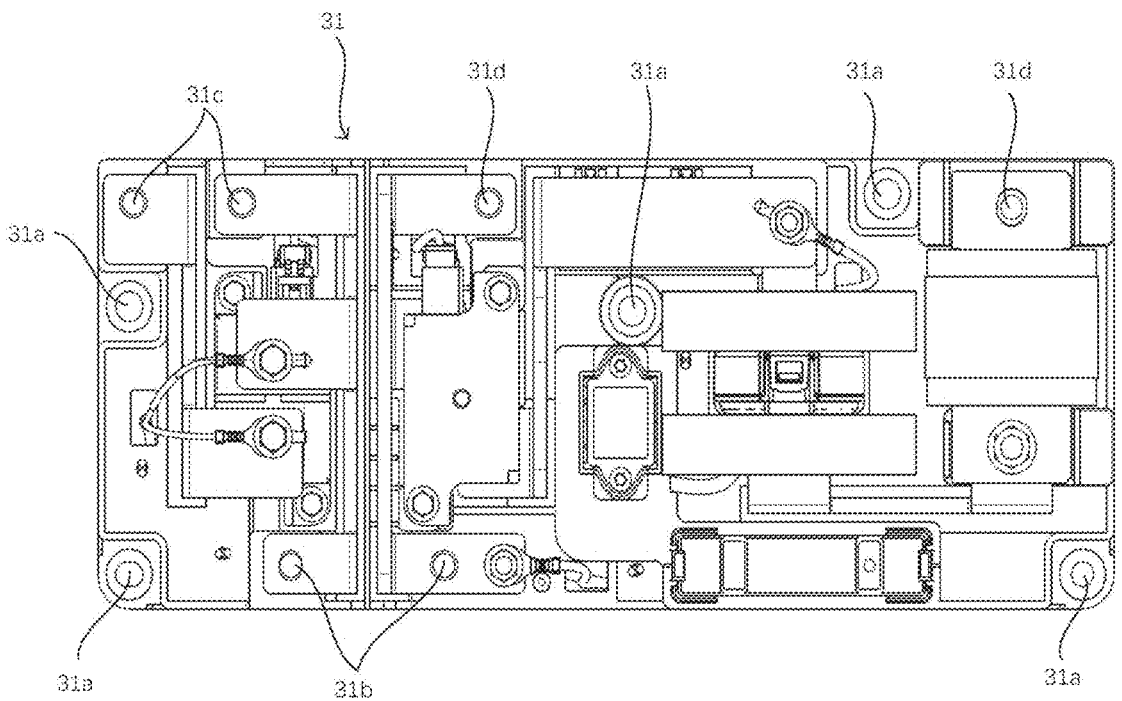
FIG. 27 is a schematic top view of the power distribution device involved in an embodiment of the present invention.

Optionally, in one embodiment, battery modules 20L and battery modules 20R connected in series are electrically connected to the power distribution device 31 as shown in FIG. 2. As shown in FIG. 22a and FIG. 26, the power distribution device 31 is provided with wiring terminal 31b and wiring terminal 31d. The wiring terminal 31b is electrically connected to the connector 52 via the high-voltage connection component 50 and the wiring terminal 31d is electrically connected to the connector 53 via the high-voltage connection component 55.

Figure 3:
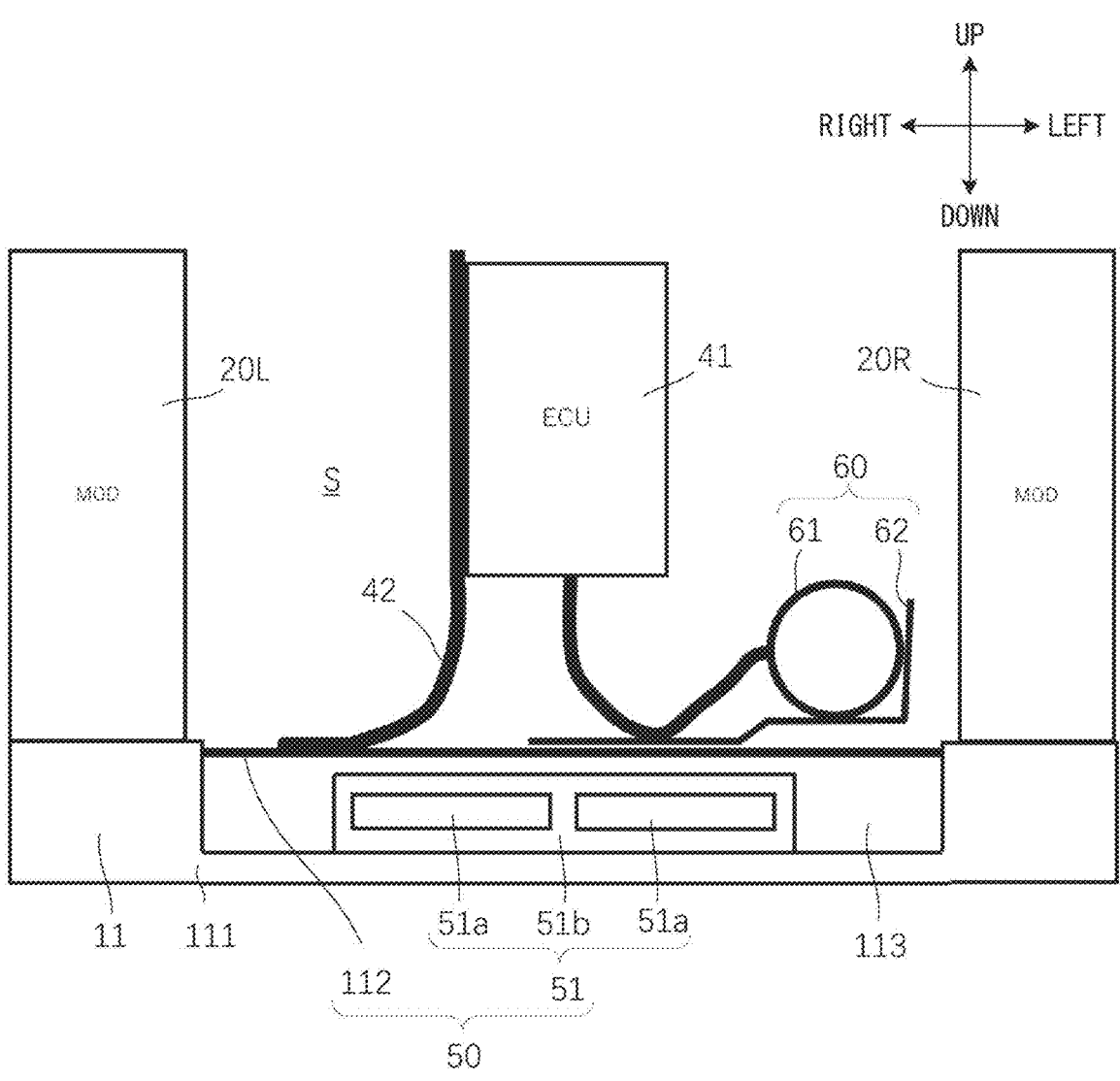
FIG. 3 is a schematic diagram of a structure of a battery pack involved in an embodiment of the present invention.

Optionally, as shown in FIG. 3, etc., the high-voltage connection component 50 may be configured in the base plate 11 of the housing 10 to reduce the risk of being impacted or crushed by the battery module 20. In this case, since the power distribution device 31 is close to the connector 53, the high-voltage connection component 50 connecting the power distribution device 31 and the connector 53 is relatively short, and therefore is not easily impacted or squeezed by the battery module 20 even when not arranged in the base plate 11. In this way, only one of the high-voltage connection component 50 and the high-voltage connection component 55 needs to be in a complicated operation for being configured in the base plate 11, and the other does not need to be configured in the base plate 11, thereby reducing the installation time. From this, it can be seen that configuring the power distribution device 31 near the connector 53 can also achieve the technical effect of reducing installation time.

Optionally, as shown in FIG. 2, etc., the plurality of battery modules 20 include a plurality of battery modules 20L and a plurality of battery modules 20R arranged in the front and back directions, respectively, and the power distribution device 31 is mounted on the battery module 20L closest to the connector 53 in the front and back directions among the plurality of battery modules 20L. In the embodiment shown in FIG. 2, the battery module on which the power distribution device 31 is mounted is the left battery module 20L and is located at the rear of the plurality of battery modules 20L. In this way, the operator does not need to cross the plurality of battery modules to operate the power distribution device 31 during maintenance and other operations, but can easily operate the power distribution device 31 from the rear.

In the embodiment shown in FIG. 2, etc., the power distribution device 31 is mounted on a single battery module 20L. As other embodiments, it may also be mounted on a plurality of (e.g., 2) battery modules 20L in close proximity.

Alternatively, as other embodiments, the power distribution device 31 may also be mounted on the right battery modules 20R.

Figure 12:
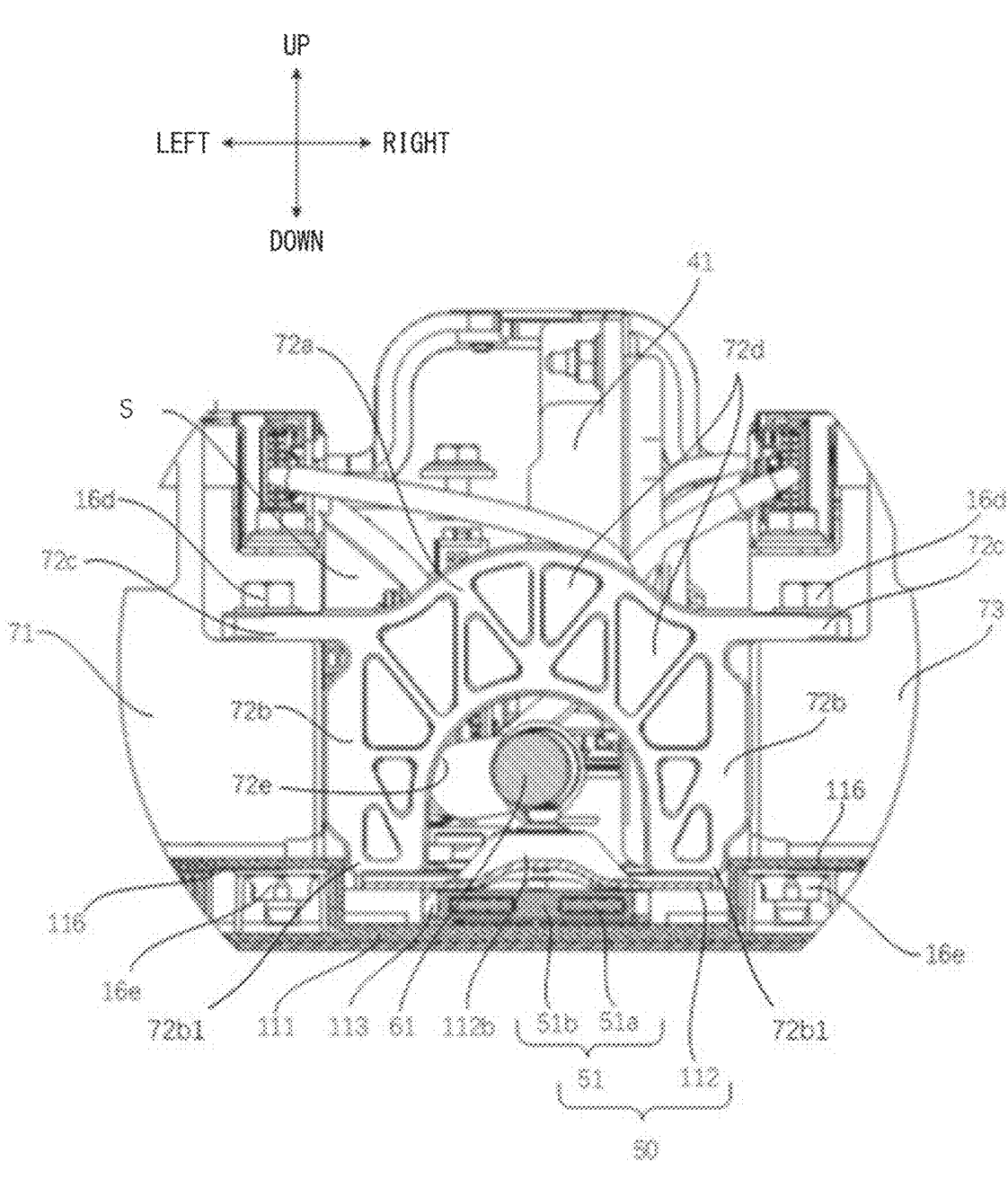
FIG. 12 is a partially enlarged view of the structure in FIG. 11.
Figure 15A:
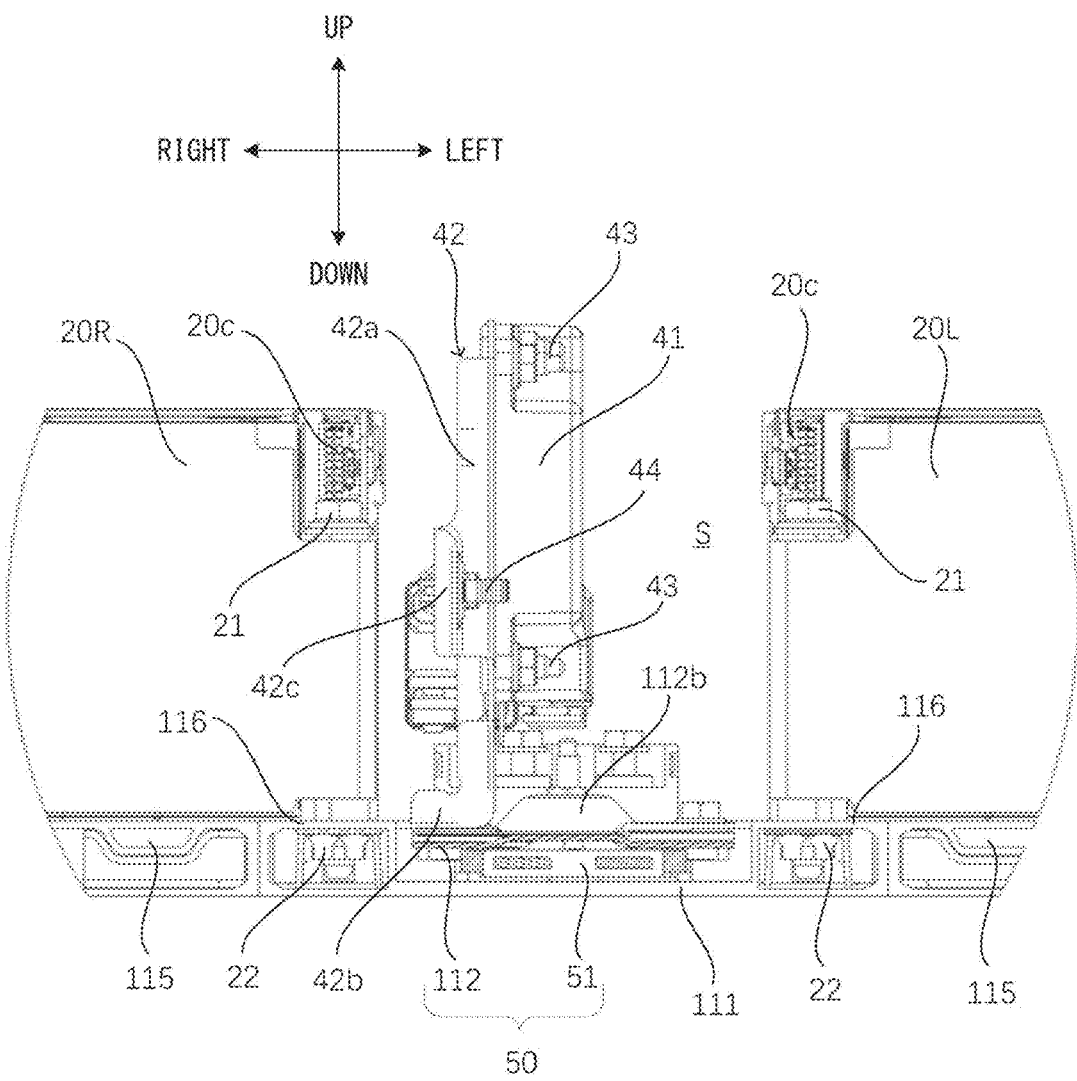
FIG. 15a is another partially enlarged view of the structure in FIG. 13.

Optionally, as shown in FIG. 3, FIG. 12 and FIG. 15a, the battery pack 100 further includes a low-voltage connection component 60 electrically connected to the plurality of battery modules 20, which is configured in the gap S.

In this way, the gap S is used to configure the low-voltage connection component 60, allowing a compact structure and facilitating miniaturization of the battery pack 100.

FIGS. 1 to 29 illustrate an embodiment of the present invention, which is described in detail below.

<Vehicle>

Figure 1:
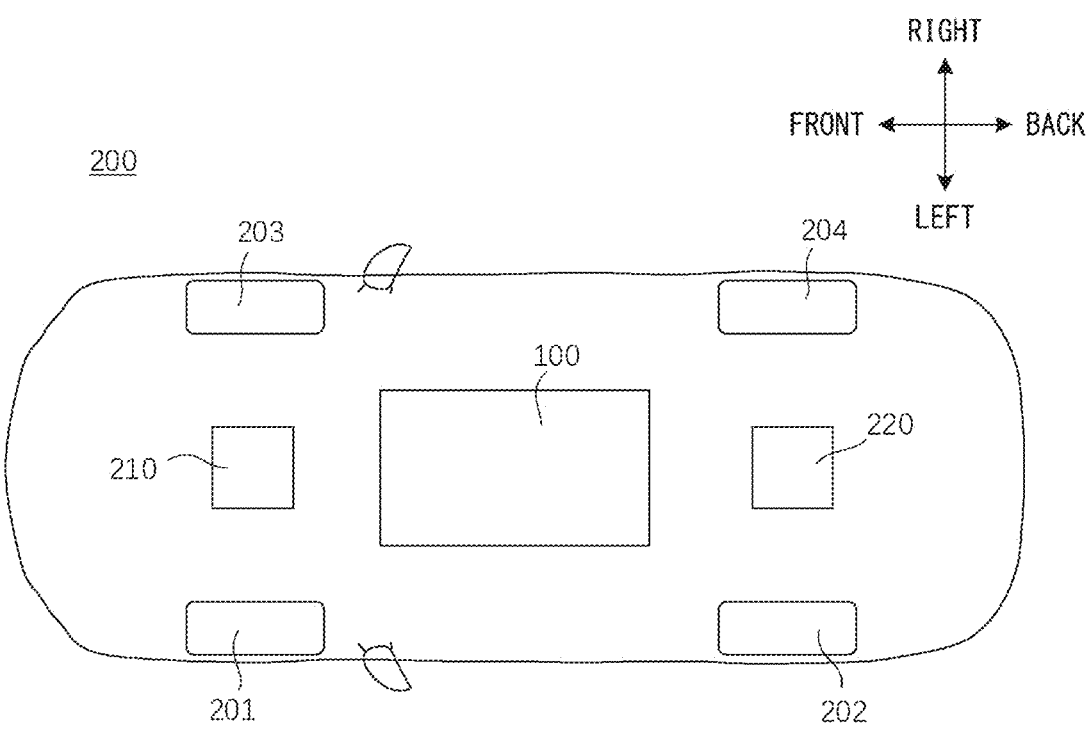
FIG. 1 is a schematic diagram of a vehicle involved in an embodiment of the present invention.

FIG. 1 is a schematic diagram of a vehicle involved in an embodiment of the present invention. As shown in FIG. 1, the vehicle 200 is an electric vehicle comprising a battery pack 100, motors 210 and 220, and wheels 201 to 204. The battery pack 100 supplies power to the motors 210 and 220. The motor 210 is configured at the front of the vehicle 200, in front of the battery pack 100, and is used to drive the two front wheels 201 and 203. The motor 220 is located at the rear of vehicle 200, behind battery pack 100, and is used to drive the two rear wheels 202 and 204. When the driver performs manual driving or the vehicle 200 performs automatic driving, the battery pack 100 supplies power to the motor 210 and/or the motor 220, and the motor 210 and/or the motor 220 drives the wheels 201 and 203 and/or the wheels 202 and 204 to rotate to make the vehicle 200 move forward or backward.

There is no particular limitation on the type of vehicle 200, which may be, for example, a car, a van, a passenger bus, or a sport utility vehicle (SUV), etc.

Alternatively, the vehicle 200 shown in FIG. 1 is a purely electric vehicle. However, the present invention is not limited to this and can also be applied in a hybrid vehicle.

Further, the vehicle 200 illustrated in FIG. 1 includes the front and rear motors 210 and 220, however, the number and configuration of motors in the present invention is not limited to this, but may also be, for example, four hub motors or wheel side motors, or three motors, etc. When three motors are included, it is possible, for example, to have one motor at the front of the vehicle 200 and two motors at the rear of the vehicle 200.

<Battery Pack as a Whole>

FIG. 2 is a schematic diagram of the principle of a battery pack involved in an embodiment. As shown in FIG. 2, the battery pack 100 comprises a housing 10, battery modules 20L and 20R, high-voltage connection components 50 and 55, and a power distribution device 31. The battery modules 20L and 20R are accommodated in the housing 10. The battery modules 20L are located in the left side of the housing 10 and the battery modules 20R are located in the right side of the housing 10. Furthermore, the battery modules 20L and 20R are spaced apart in the left and right directions, and a gap S is provided between them so that the housing 10 has an intermediate area between the left area where the battery modules 20L are configured and the right area where the battery modules 20R are configured. In this document, the letters L and R in the attached markings "20L and 20R" indicate left and right, respectively, and when no distinction is made between left and right, they are referred to as a battery module 20.

The power distribution device 31 is responsible for transferring or transmitting electrical energy from the battery pack 100 to other high voltage systems such as the motors 210 and 220 or an air conditioning compressor (not shown).

Alternatively, as shown in FIG. 2, the connectors 52 and 53 are provided at the front and rear portions of the housing 10, respectively. All of the battery modules 20 are connected in series and then electrically connected to the power distribution device 31. The power distribution device 31 is electrically connected to the connector 52 at the front through the high-voltage connection component 50, and the connector 52 is used to electrically connect to the front motor 210. In addition, the power distribution device 31 is electrically connected to the rear connector 53 via the high-voltage connection component 55, and the connector 53 is used to electrically connect to the rear motor 220.

Here, the electrical connection between the connectors 52 and 53 and the motors 210 and 220 may be a direct electrical connection or an indirect electrical connection. For example, the electrical connection can be made via an on-board AC/DC power charger, an on-board DC/DC power converter, a vehicle high voltage connection hub, etc. Alternatively, the high-voltage connection components 50 and 55 have a voltage of, for example, 400 V, 500 V, etc.

Further, as shown in FIG. 2, in this embodiment, the high-voltage connection component 50 extends forward from the vicinity of the power distribution device 31 to the vicinity of the connector 52 through the above intermediate area of the housing 10. This will be described in more detail later.

FIG. 3 is another schematic diagram of the structure of the battery pack 100, representing a local structure near the central portion in the left and right directions. As shown in FIG. 3, the battery pack 100 also includes a plurality of control devices 41 and a low-voltage connection component 60 of the battery management system (BMS). The plurality of control devices 41 are used to intelligently manage and maintain the individual battery modules 20L, 20R, to prevent overcharging and overdischarging, to extend the service life, to monitor the battery status, etc. The low-voltage connection component 60 is used to electrically connect the control devices 41 to the battery modules 20L, 20R. The voltage of the low-voltage harness 61 is, for example, 12 V.

In addition, both the high-voltage connection component 50 and the low-voltage connection component 60 are electrical connection components in this application.

The structure of each component of the battery pack 100 is described in detail below.

<Housing>

Figure 4:
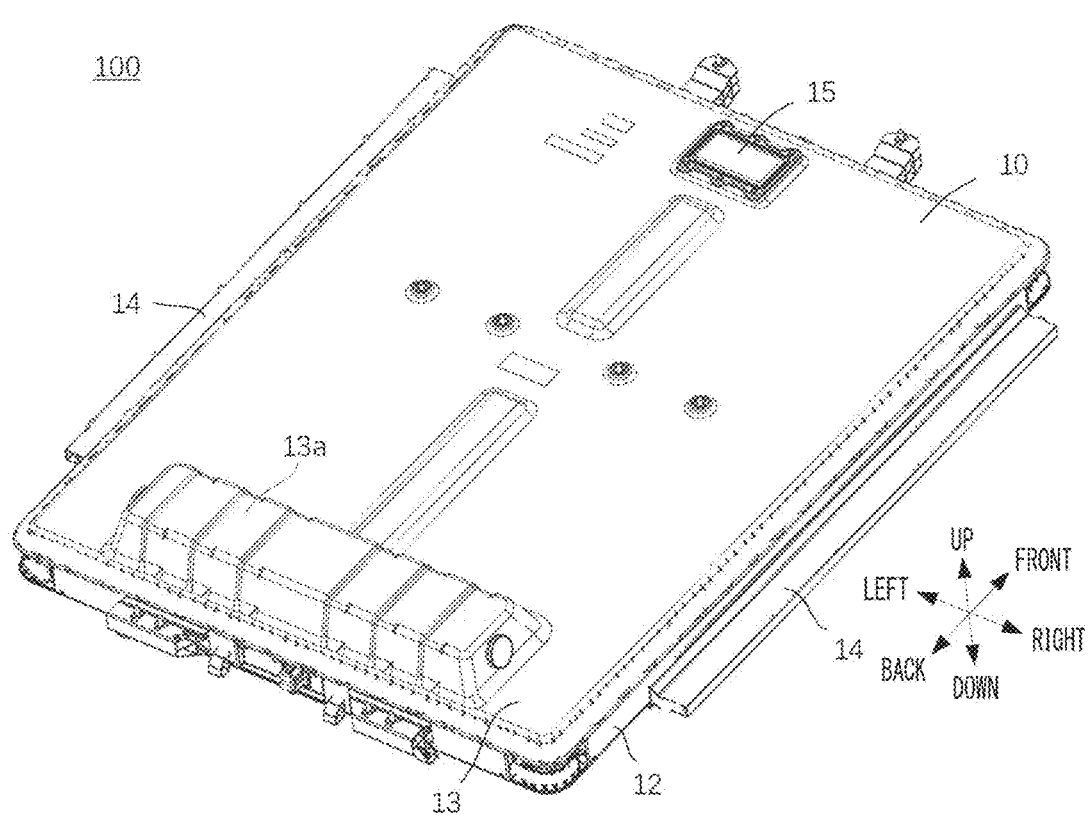
FIG. 4 is a schematic diagram of a structure of a battery pack involved in an embodiment of the present invention.
Figure 7:
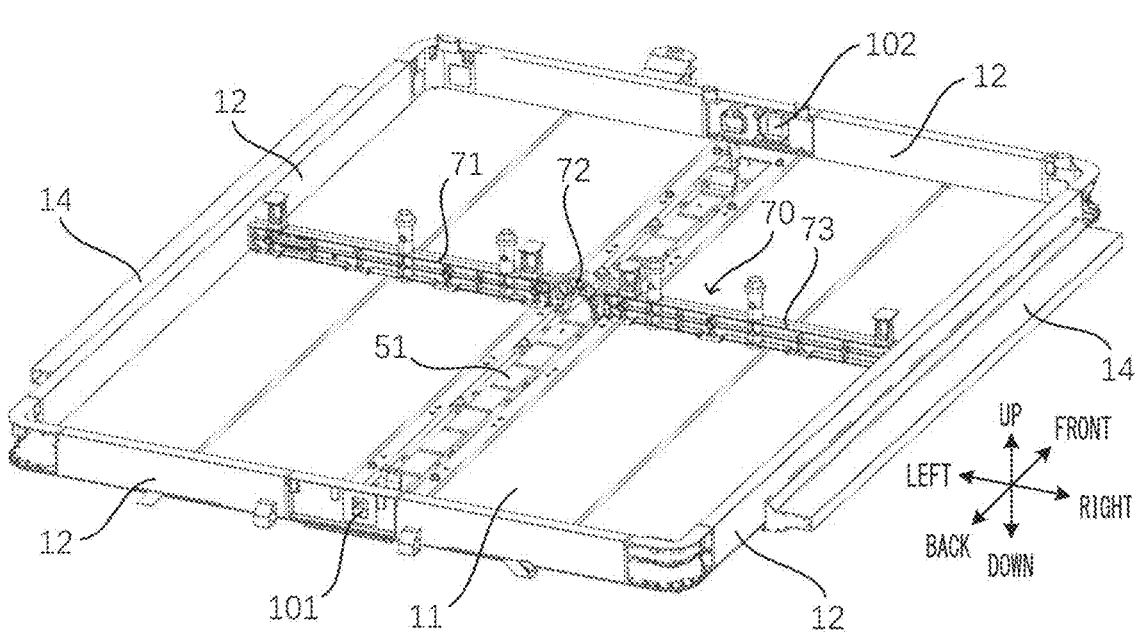
FIG. 7 is a schematic diagram of part of the structure of the housing of the battery pack in FIG. 4.

FIG. 4 is a schematic diagram of the three-dimensional structure of battery pack 100; FIG. 5 is a schematic diagram of the three-dimensional structure of the battery pack in FIG. 4 with the top cover removed; FIG. 6 is a schematic diagram of the top view of the battery pack in FIG. 4 with the top cover removed; FIG. 7 is a schematic diagram of the battery pack in FIG. 4 with the top cover removed; and FIG. 8 is a schematic diagram of the structure of FIG. 7 with the high-voltage harness removed.

Figure 8:
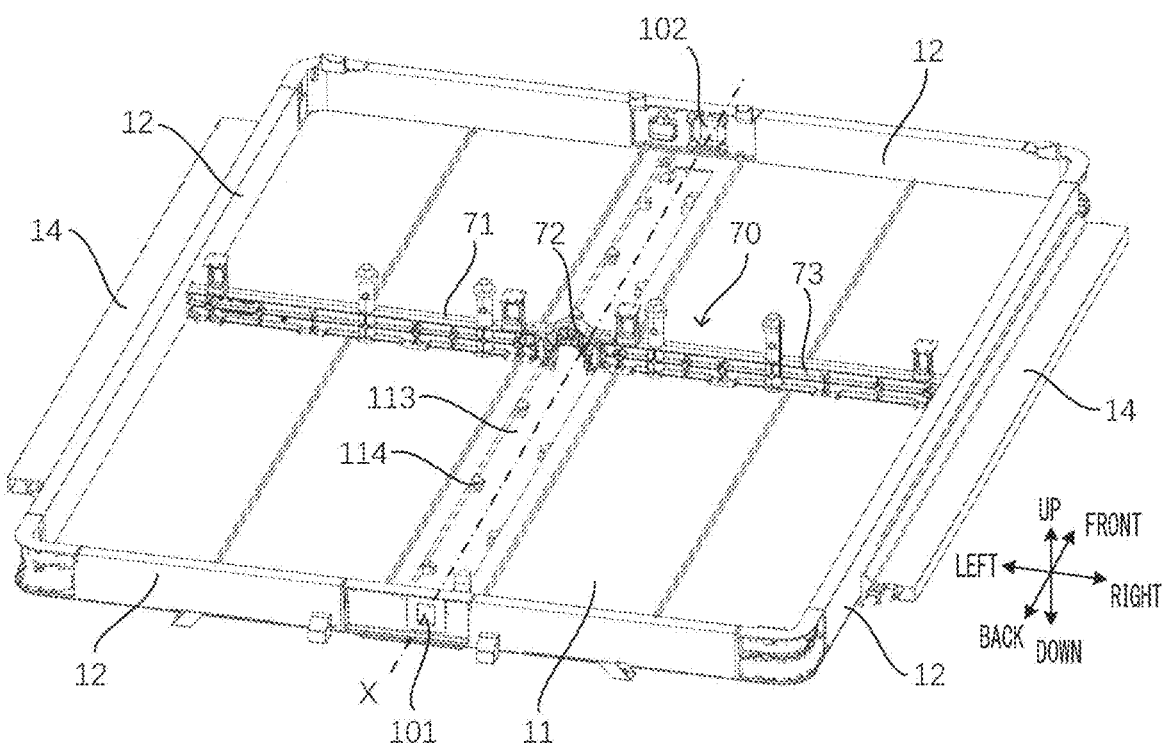
FIG. 8 is a schematic diagram of the structure in FIG. 7 in a state with the high-voltage harness removed.

As shown in FIG. 4, FIG. 7 and FIG. 8, the housing 10 of the battery pack 100 has an overall flat rectangular shape and comprises a base plate 11, side plates 12, an upper cover 13, and lugs 14. The base plate 11 is roughly rectangular in shape and its length direction is consistent with the front and back directions. Also, in this embodiment, the base plate 11 has a centerline X extending in the front and back directions and is substantially symmetrical with respect to the centerline X. In addition, in this embodiment, the base plate 11 has a centerline X extending in the front and back directions. In addition, in this embodiment, the centerline X is also the centerline of the housing 10, which means that the housing 10 is also substantially left-right symmetrical in shape. The top cover 13 is substantially the same rectangular shape as the base plate 11, and is arranged in a relative position to the base plate 11. The side plates 12 extend upward from the peripheral edges of the base plate 11 to the top cover 13. A space is formed by the base plate 11, the top cover 13 and the side plates 12 to accommodate a plurality of battery modules 20. In this embodiment, the side plates 12 are fixed to the base plate 11 and the upper cover 13 is fixed to the base plate 11. It is understood that the shape of the battery pack 100 herein is merely an illustration and does not constitute a limitation of the present invention.

As shown in FIGS. 4, 5 and 6, the lugs 14 protrude from the outer wall surface of the side plate 12. Through the lugs 14, the housing 10 and the battery pack 100 can be mounted on the body of the vehicle 200.

In addition, as shown in FIG. 4, a window plate 15 is mounted at the front and in the central part in the left and right directions of the upper cover 13. The window portion (not shown) on the upper cover 13 is left open by removing the window plate 15 so that the interior of the housing 10 can be seen. Before disassembling the battery pack 100 for maintenance, etc., it is possible to open the window plate 15 and disconnect the high-voltage circuit before disassembling the entire battery pack 100, thereby ensuring safe operation, etc.

Figure 15B:
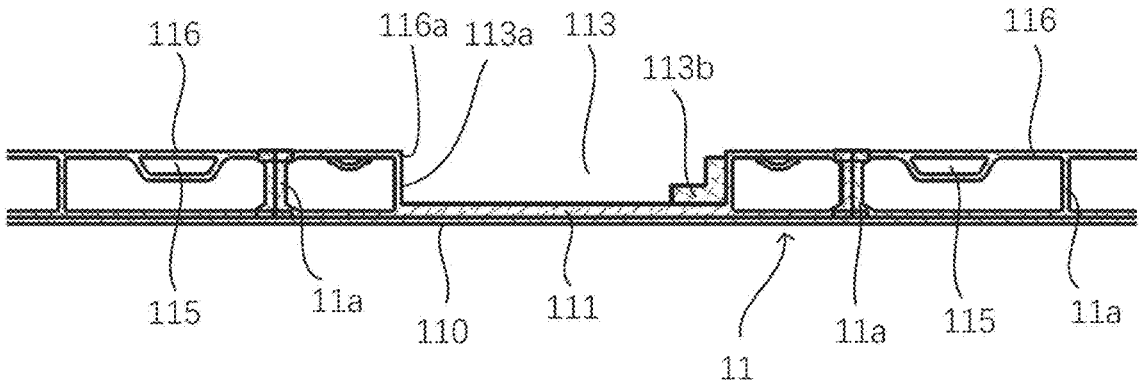

Alternatively, as shown in FIG. 8, a reinforcing component 70 is provided in the housing 10, as shown in FIG. 15b, etc., and a base plate 11 is provided with a holding portion 113 and a coolant channel 115, etc. These structures will be described in detail later.

Alternatively, as shown in FIGS. 7 and 8, a connection port 102 and a connection port 101 are provided at the front and rear portions of the housing 10, respectively. The connection port 102 is used to configure a connector 52 (FIG. 2) to enable connection of the motor 210 at the front. The connection port 101 is used to configure a connector 53 (FIG. 2) to enable connection of the motor 220 at the rear. In this embodiment, the connection port 101 and the connection port 102 are provided on the side plates 12. As other embodiments, they can also be provided on the top cover 13 or on the base plate 11. Further, in this embodiment, the connection port 101 and the connection port 102 are configured in the central part in the left and right direction of the housing 10. As other embodiments, the connection port 101 and the connection port 102 can also be provided at other locations.

<Battery Module and Related Structures>

As shown in FIG. 2, FIG. 3, FIG. 5 and FIG. 6, there are a plurality of battery modules 20L and battery modules 20R, and they are arranged on the base plate 11 (specifically, plate 116) in the front and back directions. Moreover, there is a gap S in the left and right directions between the battery modules 20L and the battery modules 20R. In addition, each battery module 20L or 20R is roughly rectangular in shape, with its height consistent with the up and down directions, its short side consistent with the front and back directions, and its long side consistent with the left and right directions. In other words, the plurality of battery modules 20L and the plurality of battery modules 20R are arranged in such a way that the long sides are adjacent to each other and the short sides are aligned.

In addition, as shown in FIGS. 2 and 5, the positive and negative electrodes of each battery module 20 are located at the two ends in the left and right directions, respectively. Also, in a plurality of battery modules 20L on the left side and a plurality of battery modules 20R on the right side, the positive and negative electrodes of adjacent battery modules 20 are configured relative to each other. That is, for example, if one left battery module 20L (or right battery module 20R) has the positive electrode at the left end and the negative electrode at the right end, then the other left battery module 20L (or right battery module 20R) adjacent to it has the positive electrode at the right end and the negative electrode at the left end. In this way, referring to the wiring between adjacent left battery modules 20L (or right battery module 20R) in FIG. 2, it can be seen that the length of the wiring between battery modules can be shortened.

Alternatively, the positive and negative electrodes of the adjacent, or opposite, battery modules 20 are configured relative to each other between the plurality of battery modules 20L and the plurality of battery modules 20R on both sides. That is, for example, if a left-side battery module 20L has a positive electrode on the left and a negative electrode on the right, then a right-side battery module 20R that is adjacent to or orthogonal to it also has a positive electrode on the left and a negative electrode on the right. In this way, for example, referring to the wiring between the front two battery modules 20L and 20R in FIG. 2, it can be seen that the length of the wiring between the battery modules can be shortened.

FIG. 25 is a schematic diagram of the three-dimensional structure of the battery module involved in this embodiment. In addition, FIG. 25 illustrates a battery module 20L on the left side, but the battery module 20R on the right side has the same structure except that it is configured in a different direction. As shown in FIG. 25, the battery module 20 is roughly rectangular in shape, with the long side in the left and right directions, the short side in the front and back directions, and the height direction the same as the up and down directions. The battery module 20 has a main part 20a with a plurality of mounting holes 20b. By threading a plurality of bolts 21 (FIG. 22a, FIG. 15a) through the mounting holes 20b, the battery module 20 can be fixed on the base plate 11 of the housing 10.

In addition, as shown in FIG. 25 and FIG. 15a, one of the left and right ends of the main part 20a is provided with a wiring terminal 20c, which is used for electrically connecting a connector 66 of the low-voltage connection component 60 (FIG. 18-FIG. 20), and then electrically connecting the control device 41 (FIG. 15, etc.). In this embodiment, as shown in FIG. 25, in the case of the battery module 20 with the battery module 20L on the left side, the wiring terminal 20c is located at the right end of the battery module 20L, and in the case of the battery module 20R with the battery module on the right side, the wiring terminal 20c is located at the left end of the battery module 20R. In other words, the wiring terminal 20c is located near the middle of the battery module 20, near the end of the gap S between the left battery modules 20L and the right battery modules 20R. In this way, since the control device 41 is configured in the gap S, it is possible to configure the wiring terminal 20c close to the control device 41 and shorten the wiring length between the control device 41 and the battery module 20.

As shown in FIGS. 5 and 6, a jumper bracket 17 that is bridge-shaped and arched upward is provided between the two front-most battery modules 20L and 20R, with one end connected to the left battery module 20L and the other end connected to the right battery module 20R. The jumper bracket 17 is obstructed near the top of a wiring terminal 58 that will be described below, and the window plate 15 described above covers the top of the jumper bracket 17. The jumper bracket 17 is equivalent to a switch (manual service switch) for the high voltage system circuit inside the battery pack 100, and before disassembling the battery pack 100 for maintenance, etc., the window plate 15 can be opened and then the jumper bracket 17 can be removed so that the high voltage circuit cannot generate conduction and is disconnected, thus allowing safe maintenance to be performed on the high voltage system.

The battery pack 20 may contain a plurality of cells (single cells) that may be housed within a rectangular shaped battery pack housing, oriented along the long side of the battery pack housing. It goes without saying that the number of cells does not constitute a limitation of the present invention, and even if the battery module 20 has only one cell, it does not affect the implementation of the present invention.

<High-Voltage Connection Component and Related Structure>

Figure 9:
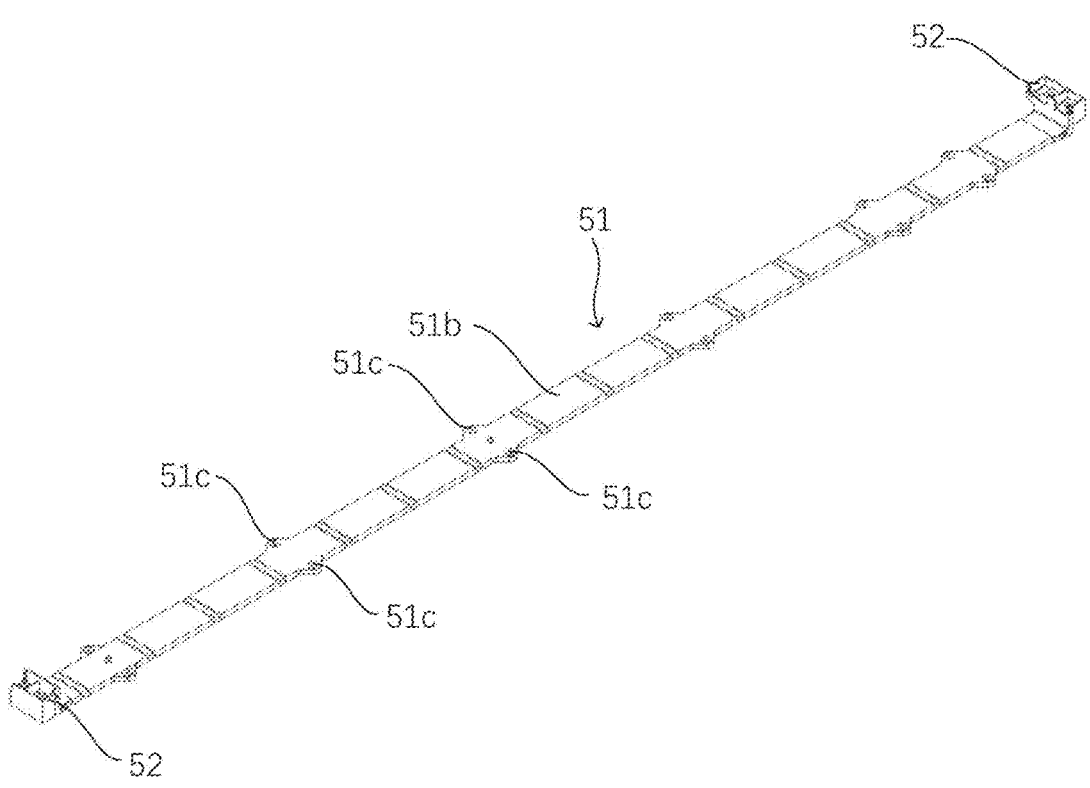
FIG. 9 is a schematic diagram of the structure of the high-voltage harness involved in one embodiment of the present invention.
Figure 11:
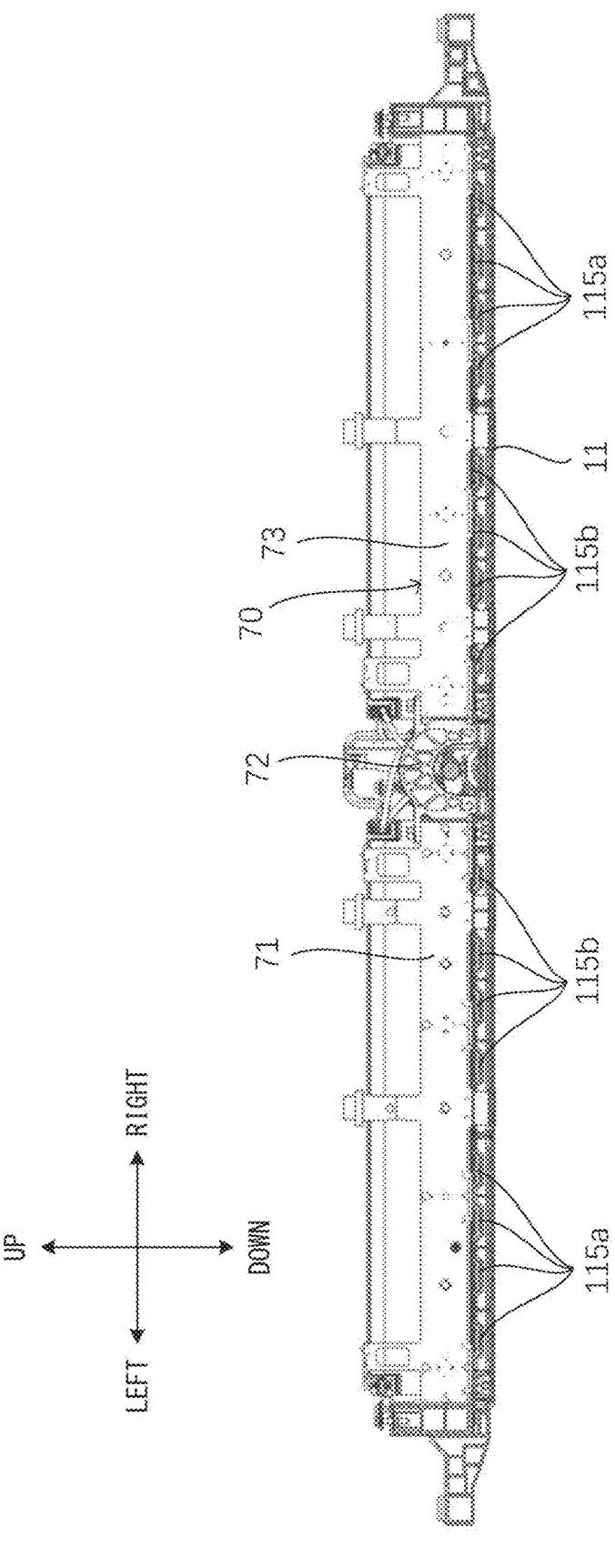
FIG. 11 is a cross-sectional schematic diagram of the structure in FIG. 6.
Figure 13:
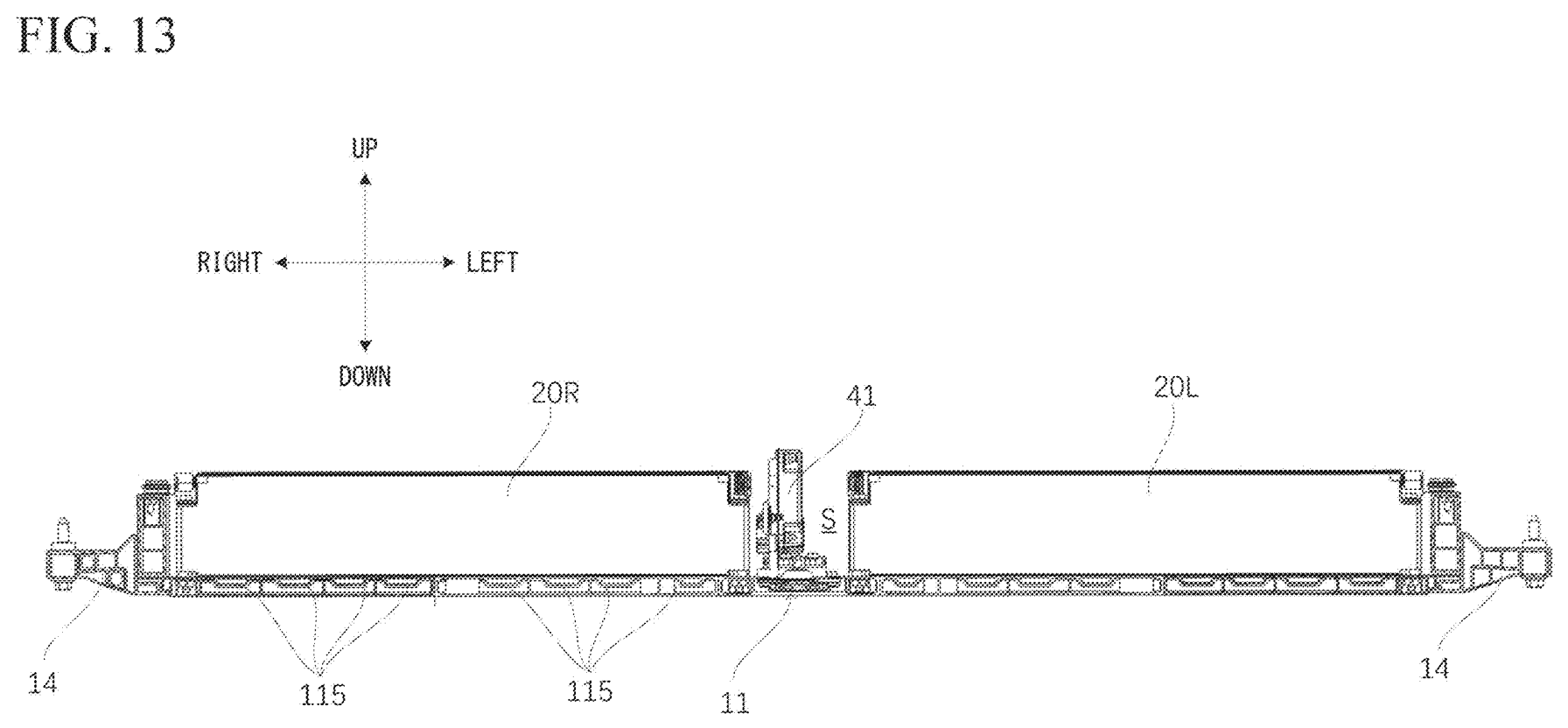
Figure 14:
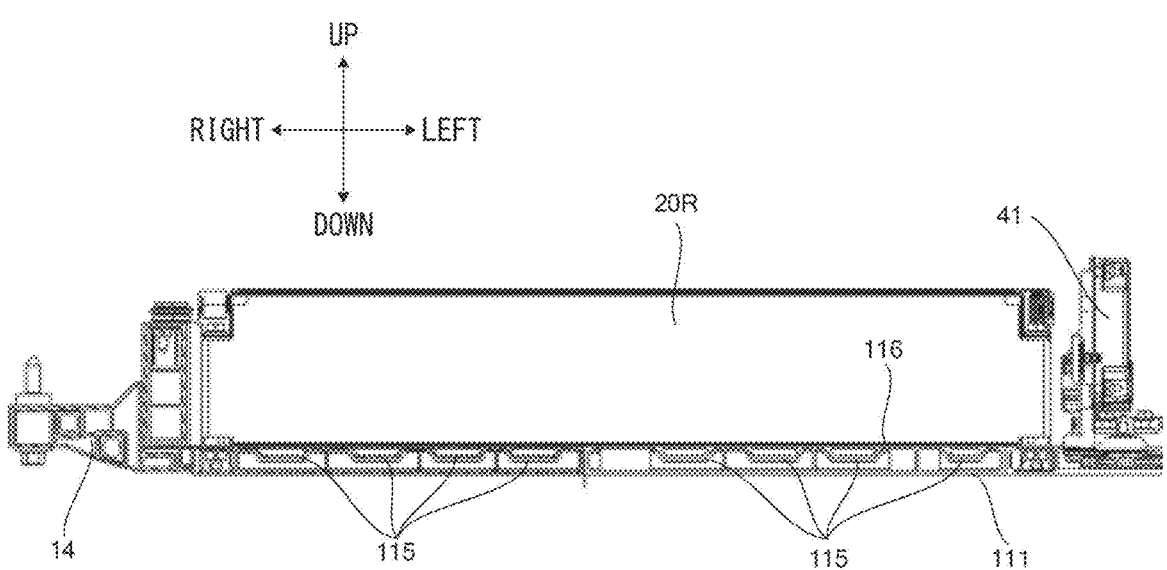
FIG. 14 is a partially enlarged view of the structure in FIG. 13.
Figure 16:
FIG. 16 is a schematic diagram of the combined state of the low-voltage connection component and the control device and its peripheral structures involved in one embodiment of the present invention.
Figure 17:
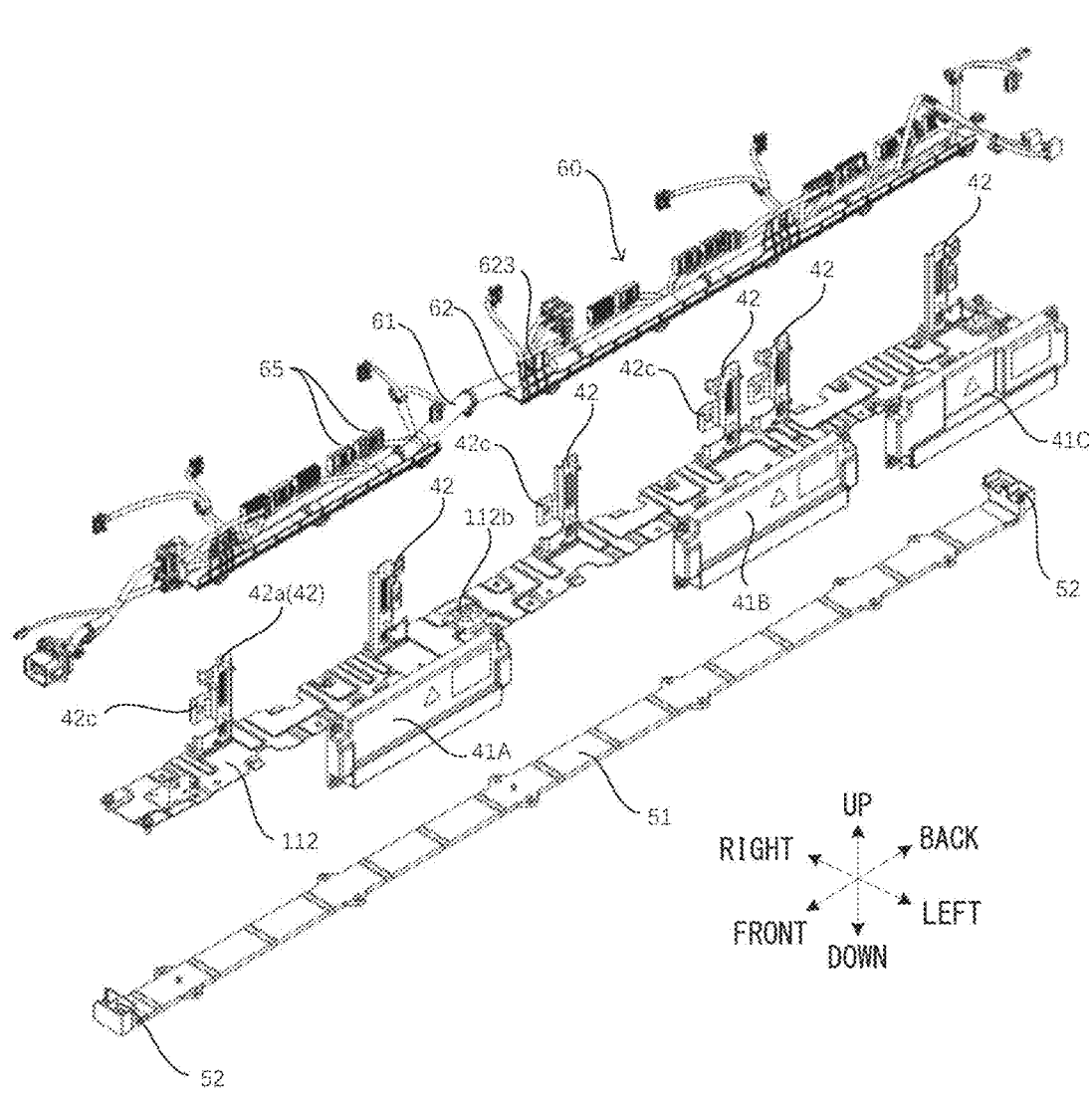
FIG. 17 is a schematic diagram of the structure in FIG. 16 in a disassembled state.
Figure 21A:
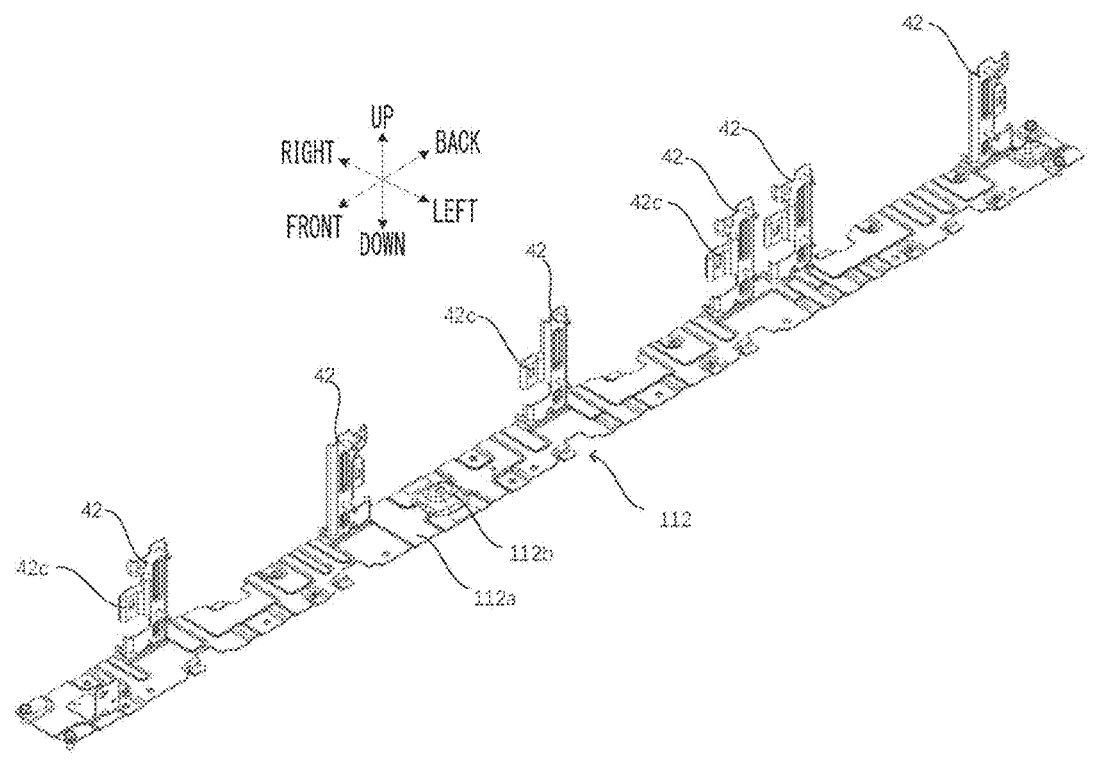
FIG. 21a is a schematic diagram of the structure of the combined state of the high-voltage harness bracket and the control device bracket involved in one embodiment of the present invention.
Figure 21B:
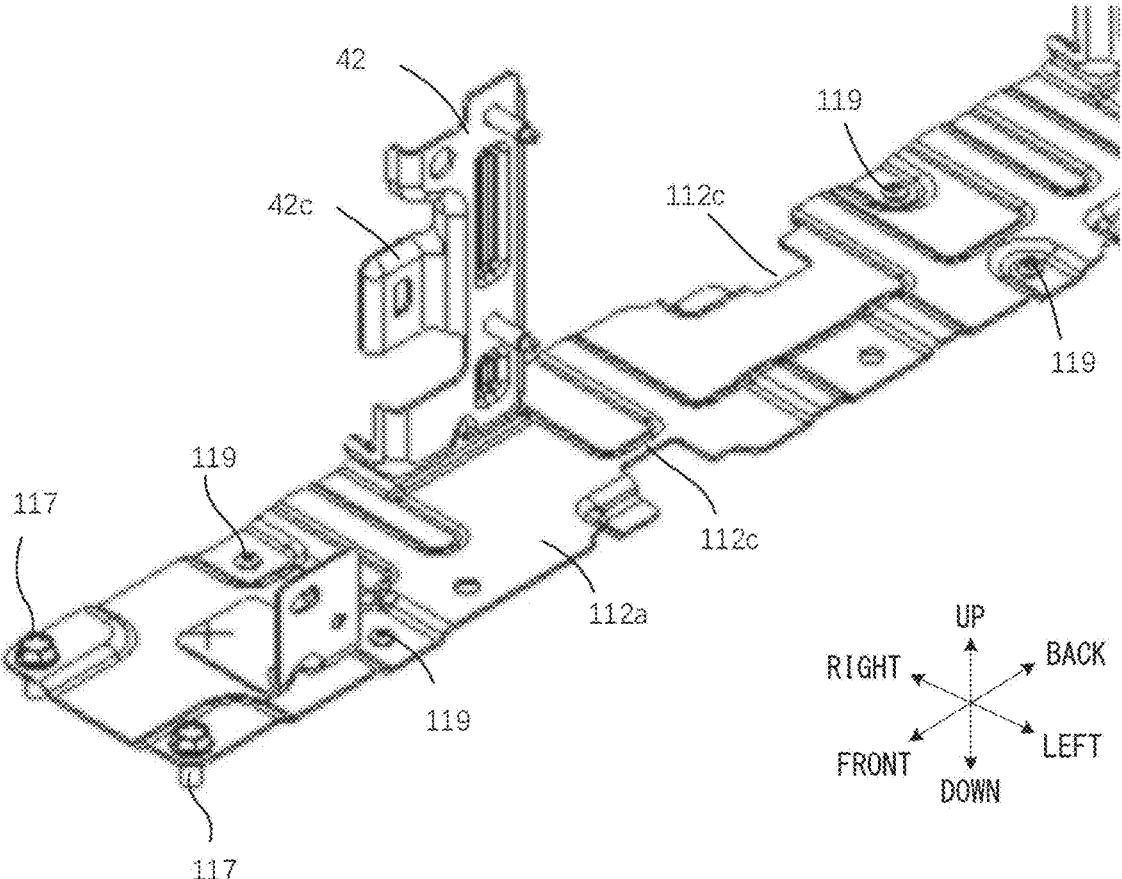
Figure 21C:
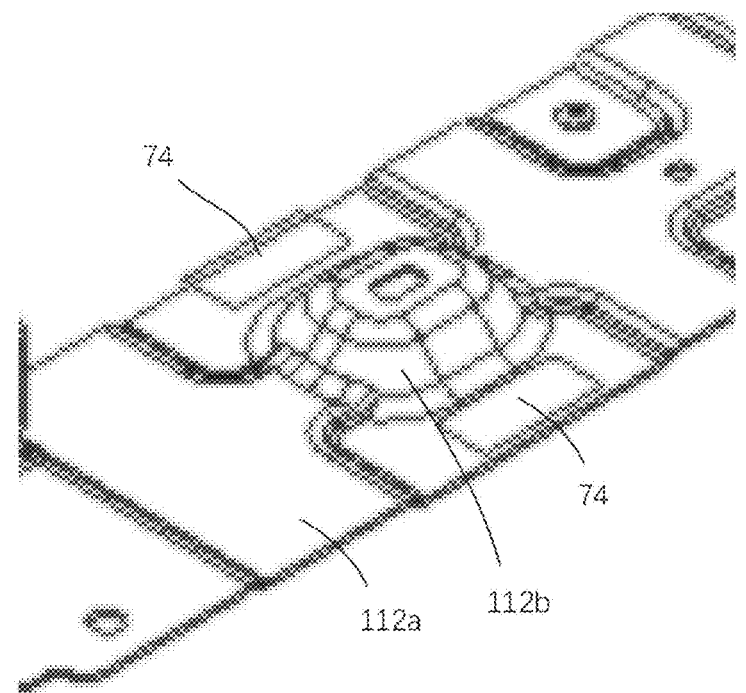
Figure 21D:
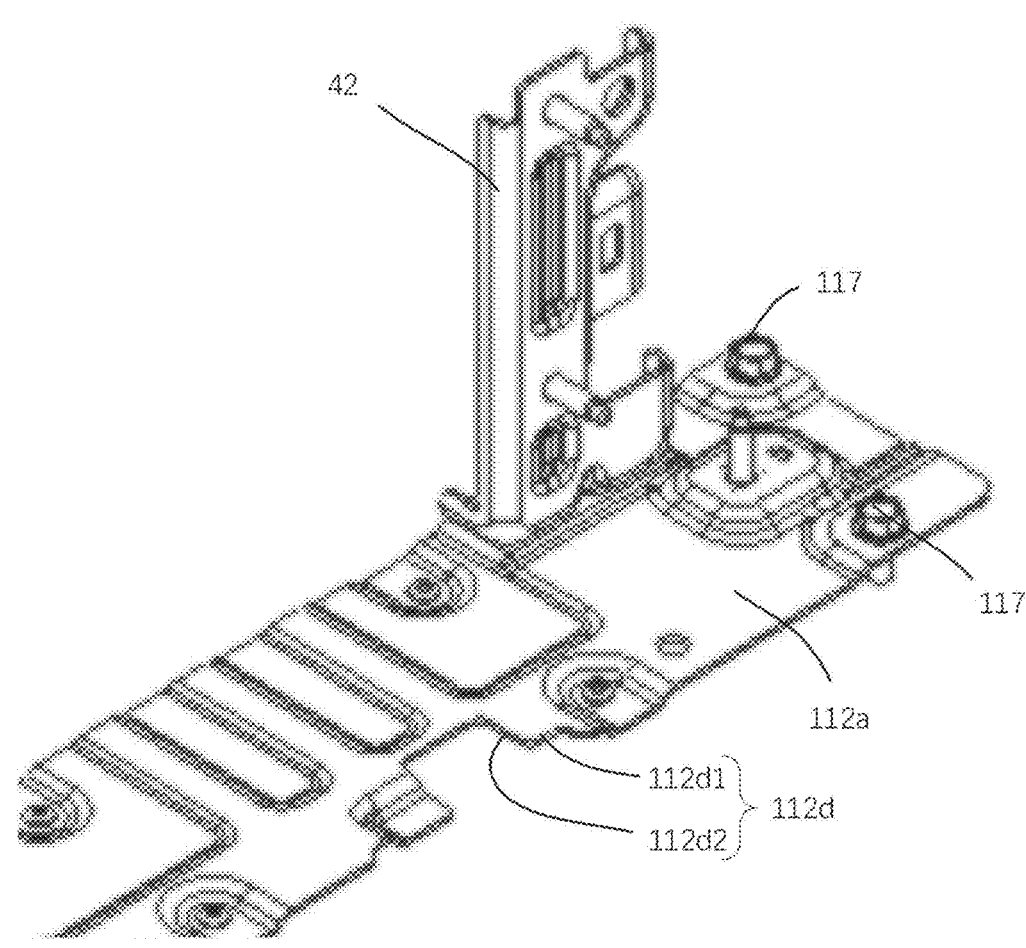

FIG. 9 is a schematic diagram of the structure of the high-voltage harness involved in this embodiment; FIG. 11 is a cross-sectional diagram of the structure in FIG. 6; FIG. 12 is a partially enlarged view of the structure in FIG. 11; FIG. 13 is another cross-sectional view of the structure in FIG. 6; FIG. 14 is a partial enlargement of the structure in FIG. 13; FIG. 15a is another partially enlarged view of the structure in FIG. 13; FIG. 16 is a schematic diagram of the combined state of the low-voltage connection component and the control device and its peripheral structures involved in this embodiment; FIG. 17 is a schematic diagram of the structure in FIG. 16 in a disassembled state; FIG. 21a is a schematic diagram of the structure of the combined state of the high-voltage harness bracket and the control device bracket involved in this embodiment; FIG. 21b is a partially enlarged view of the structure shown in FIG. 21a; FIG. 21c is another partially enlarged view of the structure shown in FIG. 21a; and FIG. 21d is another partially enlarged view of the structure shown in FIG. 21a.

As shown in FIG. 3, FIG. 12, FIG. 15a, FIG. 16 and FIG. 17, the high-voltage connection component 50 includes a high-voltage harness 51, a wiring terminal 58 (an example of a connector), and a high-voltage harness bracket 112. The high-voltage harness 51 is an elongated component for transmitting electrical energy. There are two wiring terminals 58 separately set at both ends of the high-voltage harness 51, one for electrical connection to the power distribution device 31 and the other for electrical connection to the connector 52 (FIG. 2). The high-voltage harness 51 is mounted on the high-voltage harness bracket 112, which is mounted on the base plate 11, i.e. the high-voltage harness 51 is mounted on the base plate 11 through the high-voltage harness bracket 112.

It will be understood that the "harness" may be made of multiple wires or a single wire.

As shown in FIG. 2, FIG. 3, FIG. 9, FIG. 12 and FIG. 15a, the high-voltage harness 51 is flat in a cross section, specifically in this embodiment, it is substantially flat and rectangular in the cross section. Here, the cross section is the cross section perpendicular to the wire length of the high-voltage harness 51; "flat" means a shape in which a dimension in one direction is smaller than a dimension in another direction, for example, in the state in FIG. 12, the height dimension (the dimension in the up and down directions) of the high-voltage harness 51 is smaller than the width dimension (the dimension in the left and right directions). Thus, the height direction of the high-voltage harness 51 is also the thickness direction. It will be understood that the flat cable can be reduced in size in one direction compared to a round cable or a square cable, under the same conductivity. For example, referring to the circular low-voltage harness 61 and the flat high-voltage harness 51 shown in FIG. 12, the dimensions in the up and down directions of the high-voltage harness 51 are significantly smaller than those of the low-voltage harness 61. Additionally, it may be worth noting that the low-voltage harness 61 and the high-voltage harness 51 are compared to illustrate the characteristics of the flat high-voltage harness 51, and there is no need for the conductivity of the low-voltage harness 61 and the high-voltage harness 51 to be the same.

Referring to FIGS. 3 and 12, the high-voltage harness 51 includes a conductive component 51a and a cladding layer 51*b* that covers the conductive component 51*a*. The conductive component 51*a* is made of a metal, and as an example of its materials, copper may be used, i.e., the conductive component 51*a* is a copper busbar. It goes without saying that other conductive materials can be used for the conductive component 51*a*. As an example, the cladding layer 51*b* is an insulating layer, which can be made of a plastic. It goes without saying that other materials, such as rubber, can be used for the cladding layer 51*b*.

Furthermore, in this embodiment, there are two conductive components 51*a*, each of which is covered by the cladding layer 51*b*, so that a short circuit between the two conductive components 51*a* is reliably avoided by the cladding layer 51*b*. Furthermore, in this embodiment, the conductive component 51*a* has a substantially rectangular cross section and the cladding layer 51*b* has a substantially flat rectangular cross section, with the long sides of both rectangles oriented parallel to each other and the short sides oriented parallel to each other.

As shown in FIG. 3, FIG. 12 and FIG. 15*a*, a holding portion 113 is provided on the base plate 11 and the high voltage connection component 50 is configured in the holding portion 113.

As shown in FIG. 3, FIG. 12, FIG. 15*a* and FIG. 15*b*, the base plate 11 of the housing 10 includes a plate 111 and a plate 116, the plate 111 and the plate 116 are disposed opposite each other and spaced apart, the plate 116 is disposed above the plate 111, and the battery module 20 is disposed above the plate 116. The battery module 20 is configured above the plate 116. The holding portion 113 is configured in the up and down directions within a height range between the plate 111 and the plate 116.

Thus, for example, when the vehicle is subjected to a lateral collision, the battery pack 100 deforms and the battery module 20 moves in the horizontal direction, etc. However, since the high-voltage connection component 50 is configured in the base plate 11 below the battery module 20, the battery module 20 is less likely to hit the high-voltage connection component 50, thereby inhibiting the occurrence of problems such as deformation, breakage, fracture, leakage and damage to the electrical connection (including poor contact or electrical connection failure) of the high-voltage connection component 50, thereby improving the safety and reliability of the battery pack 100.

In this embodiment, the base plate 11 and the plates 111 and 116 are configured horizontally, with their extension directions substantially in the horizontal direction and their thickness directions substantially in the up and down directions.

Further, as shown in FIG. 11, FIG. 13 and FIG. 14, in this embodiment, a plurality of coolant channels 115 are formed between the plate 111 and the plate 116. That is, the holding portion 113 is located between the plate 111 and the plate 116 along with the coolant channels 115, so that the plurality of coolant channels 115 can be easily utilized to chill the high-voltage connection component 50 (high-voltage harness 51).

In addition, the coolant channels 115 are configured directly below the battery modules 20L, 20R, and viewed in the up and down directions, the coolant channels 115 overlap the battery modules 20L or battery modules 20R. That is, the coolant channels 115 are configured in the horizontal direction opposite the battery modules 20L and 20R, and are configured close to the battery modules 20L and 20R, thereby enabling effective cooling of the battery modules 20L and 20R.

As shown in FIG. 13, FIG. 15*a*, etc., the holding portion 113 (and the high-voltage connection component 50 therein) is configured in the horizontal direction at a position staggered from the battery modules 20L, 20R, as viewed in the up and down directions. In this way, it is possible to use the part of the base plate 11 that is not equipped with coolant channels 115 to configure the holding portion 113, effectively utilizing the space of the base plate 11 and making the battery pack 100 more compact and easy to miniaturize. On the one hand, it is possible to avoid affecting the cooling effect on the battery module 20. On the other hand, by keeping the holding portion 113 as far as possible from the battery modules 20L and 20R, electromagnetic waves from the high-voltage harness 51 can be suppressed from interfering with the battery modules 20L and 20R.

In addition, in this embodiment, the battery modules 20L are configured on the left side of the base plate 11, and the battery modules 20R are configured on the right side of the base plate 11, the holding portion 113 is provided in the middle between the left side and the right side, and the high-voltage connection component 50 is configured in the holding portion 113. In other words, in the base plate 11, the holding portion 113 is horizontally configured between the battery modules 20L on the left side and the battery modules 20R on the right side, is relative to the gap S, and coincides with the gap S when viewed in the up and down directions. In this way, it is possible, for example, to reduce the impact force on the high-voltage harness 51 during a collision and to suppress damage to the high-voltage harness 51, etc., compared to the position of the holding portion 113 near the outer part of the base plate 11 in the left and right directions.

In addition, as shown in FIG. 3, FIG. 12, FIG. 15*a*, etc., in this embodiment, the high-voltage harness 51, like the high-voltage connection component 50, is also flat in a cross section and is accommodated in the holding portion 113 such that its thickness direction is roughly consistent with the thickness direction of the base plate 11. Thus, the height of the high-voltage harness 51 can be reduced as much as possible while ensuring that the high-voltage harness 51 can effectively transmit electrical energy. Thereby, it is possible to effectively suppress the impact of the high-voltage harness 51 on the battery module 20 and improve the safety of the battery pack 100. As mentioned above, "flat" means a shape in which a dimension in one direction is smaller than a dimension in another direction, and on this basis, it is understood that the thickness direction of the flat high-voltage harness 51 is the direction in which the dimension in the two aforementioned dimensions is relatively smaller, which in this embodiment is approximately the same as the up and down directions.

As shown in FIG. 15*b*, the upper side of the holding portion 113 has an opening 116*a*, which may also be described as an opening formed in the plate 116. During assembly, the high-voltage connection component 50 can be placed into the holding portion 113 through this opening 116*a*. In this embodiment, the support portion 113*b* is in the form of a step, and the high-voltage harness bracket 112 is supported by the upper surface of the step. In addition, as shown in FIG. 15*b*, the housing 10 also comprises a plate 110 that covers the underside of the plate 111, for example, to protect the plate 111. In addition, in this embodiment, the holding portion 113 is formed as a long slot extending in front and back directions with an opening 116*a* facing upward.

Alternatively, as shown in FIG. 12, FIG. 15*a* and FIG. 17, in this embodiment, the high-voltage harness 51 is mounted from below on the high-voltage harness bracket 112, which covers the opening 116a and forms the top of the holding portion 113. When assembled, the high-voltage harness 51 can be mounted on the high-voltage harness bracket 112 first, and then the high-voltage harness bracket 112 with the high-voltage harness 51 can be mounted on the base plate 11. In this way, the high voltage harness 51 can be easily installed and positioned.

Alternatively, in this embodiment, the bottom of the holding portion 113 is formed by the plate 111.

Further, in this embodiment, the holding portion 113 extends from the front end of the base plate 11 to the rear end, and the high voltage harness bracket 112 is elongated and extends from the front end of the base plate 11 (or plate 116) to the rear end portion, covering substantially the entire holding portion in the front and back directions. Thus, the strength of the base plate 11 in the front and back directions can be increased by the high-voltage harness bracket 112. In addition, the high-voltage harness bracket 112 is elongated and the high-voltage harness 51 is elongated, and both are configured in the same length direction, such that the high-voltage connection component 50 is also elongated and extends from the front end of the base plate 11 (or plate 116) to the rear end.

Further, in this embodiment, the high-voltage harness 51 is fixed to the high-voltage harness bracket 112 by fixing the cladding layer 51b to the high-voltage harness bracket 112. In this way, the cladding layer 51b both insulates the conductive component 51a and fixes the conductive component 51a to the high-voltage harness bracket 112.

As a more specific structure, as shown in FIG. 9, the cladding layer 51b of the high-voltage harness 51 is provided with protrusions 51c protruding outward on each side surface in the width direction, by which the high-voltage harness 51 is fixed to the high-voltage harness bracket 112. Specifically, for example, a through-hole can be provided in the protrusion 51c so that a rivet or a screw 119 (FIG. 21b) can pass through the through-hole and fix the high-voltage harness 51 to the high-voltage harness bracket 112. In addition, the present invention is not limited to this, for example, a snap can be provided on the high-voltage harness bracket 112 so that the protrusion 51c snaps into the snap, thereby fixing the high-voltage harness 51 to the high-voltage harness bracket 112. In addition, in this embodiment, a plurality of protrusions 51c are provided on each side of the width of the cladding layer 51b, and the plurality of protrusions 51c are arranged along the length of the high-voltage harness 51. In this way, the high-voltage harness 51 is fixed to the high-voltage harness bracket 112 at a plurality of positions in the length direction, thereby improving the bonding strength of the high-voltage harness 51 and the high-voltage harness bracket 112 and increasing the strength of the high-voltage connection component 50, for example, the strength for effectively resisting impact forces from the front and back directions.

Further, in this embodiment, the protrusion 51c is integrally formed with the cladding layer 51b.

Alternatively, the holding portion 113 may penetrate through the plate 116 in the front and back directions, or may not penetrate through the plate 116, or may penetrate through one end without penetrating through the other end.

As shown in FIG. 12, FIG. 15a, etc., in this embodiment, the height of the high-voltage harness bracket 112 is lower than that of the plate 116, i.e., the height of high-voltage harness bracket 112 is lower than that of the plate 116 in the up and down directions. Alternatively, as other embodiments, the height of the high-voltage harness bracket 112 may be approximately the same as that of the plate 116 or may be higher than that of the plate 116.

In this embodiment, the high-voltage harness bracket 112 is a metal part, so that it can shield the high-voltage harness 51 from electromagnetic waves and suppress the high-voltage harness 51 from interfering with the battery module 20, etc. The high-voltage harness bracket 112 is, for example, a sheet metal part. In other embodiments, the high-voltage harness bracket 112 may be made of other materials, such as plastics.

By making the height of the high-voltage harness bracket 112 lower than or approximately equal to the plate 116, the horizontal movement of the battery module 20 can be reliably suppressed.

As shown in FIG. 3, FIG. 12, FIG. 15a, FIG. 16, etc., a low-voltage connection component 60 is provided in the gap S above the high-voltage harness bracket 112. The low-voltage connection component 60 is used to electrically connect the control device 41 to the battery module 20. In this way, the low-voltage connection component 60 can be configured close to the high-voltage connection component 50, making the structure compact, effectively using space, and improving the space utilization efficiency in the battery pack 100.

In addition, in this embodiment, a reinforcing component 70 is provided transversely above the plate 116, so that the overall strength of the housing 10 can be strengthened and the setting of the coolant channels 115 is not affected (the coolant channels 115 can be set without considering avoiding the projection).

In this embodiment, as shown in FIG. 11, there are a plurality of coolant channels 115, and the plurality of coolant channels 115 are arranged from the middle in the left and right directions toward the outer part, as seen from the front and back directions. The coolant channel 115a near the outer part is located upstream along the liquid flow, and the coolant channel 115b near the middle is located downstream along the liquid flow. In other words, the part of the coolant channel 115 that is farther from the centerline X of the base plate 11, i.e., the coolant channel 115a, is located upstream along the liquid flow, and the part that is closer to the center line of the base plate 11, i.e., the coolant channel 115b, is located downstream along the liquid flow. The coolant flows in from the coolant channel 115a and flows out from the coolant channel 115b. Thus, the coolant cools the outer part of the battery module 20 first, and in this way, the battery module 20 can be cooled well. Specifically, the outer part of the battery module 20 is more susceptible to external influences. Therefore, in this embodiment, the outer part of the battery module 20 is cooled first, so that the battery module 20 can be cooled well.

In addition, in this embodiment, a coolant channel 115 is provided near the periphery of the housing 113 so that the high-voltage connection component 50 (high-voltage harness 51) can be cooled effectively.

Alternatively, the high-voltage connection component 50 may be completely contained in the housing 113 or partially contained in the housing 113. In this embodiment, the high voltage harness 51 is housed in the housing 113 as a whole, with the wiring terminals 58 at each end partially protruding above the high-voltage harness bracket 112, thereby enabling easy wiring operations.

As shown in FIG. 15b, in order to maintain stable spacing between the plate 111 and the plate 116, protrusions 11a may be provided on either or both of them to protrude toward the other side, and the protrusions 11a may be provided in a plurality. In this embodiment, the plate 111 and the plate 116 are formed separately and assembled together by bolting or welding, etc. In other embodiments, the plate 111 and the plate 116 may also be formed as one piece. In this embodiment, the protrusions 11*a* are formed as long and convex ribs extending in the front and back directions.

As shown in FIG. 12, FIG. 15*a*, FIG. 16, FIG. 17 and FIG. 21*a*, the high-voltage harness bracket 112 includes a main part 112*a* and a raised part 112*b*, with the main part 112*a* being substantially rectangular in shape and having a substantially horizontally oriented plate surface direction so as to cover the opening 116*a* of the holding portion 113 well. The raised part 112*b* is raised upward from the main part 112*a* and is used to hold the main wire portion 611 of the low-voltage harness 61 (FIG. 16). This will be described in more detail later.

Figure 29:
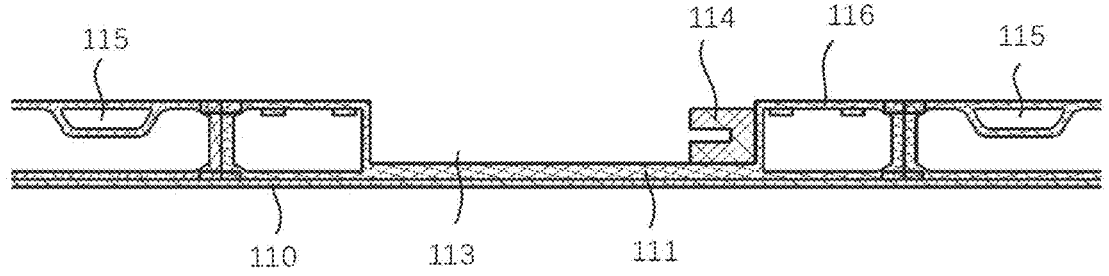
FIG. 29 is a schematic diagram for illustrating the structure of the snap portion involved in an embodiment of the present invention.

As shown in FIGS. 8 and 29, a snap portion 114 that protrudes from the left and right side wall surfaces 113*a* of the holding portion 113 and has a recess recessed toward the root side (the opening of the recess faces the middle of the left and right directions of the holding portion 113) is provided on the left and right side wall surfaces 113*a* (FIG. 15*b*) of the holding portion 113, and the high-voltage harness bracket 112 is inserted in the recess thereby limiting the movement in the up and down directions and the left and right directions. In addition, the snap portion 114 is provided on the left and right side walls of the holding portion 113. In addition, there are a plurality of the snap sections 114 on the left and right side walls of the holding portion 113, arranged in the front and back directions. In this way, the position of the high-voltage harness bracket 112 can be reliably kept stable.

As shown in FIG. 21*b*, notched portions 112*c* are provided on both edges of the main part 112*a* in the width direction, the number of notched portions 112*c* corresponds to that of the snap portions 114 (FIG. 8) on the base plate 11, and the notched portions 112*c* can accommodate the snap portions 114. When assembling the high-voltage harness bracket 112 on the base plate 11, each notched portion 112*c* is first aligned with corresponding snap portion 114, so that the snap portion 114 enters the notched portion 112*c*. In this state, the high-voltage harness bracket 112 moves forward and backward so that the edge of the main part 112*a* is inserted into the snap portion 114, and the snap portion 114 limits the upward and downward movement of the high-voltage harness bracket 112.

Further, in this embodiment, in order to easily insert the edge of the main part 112*a* into the snap portion 114, the opening width of the snap portion 114 (i.e., the opening size in the up and down directions) is larger than the thickness of the main part 112*a*, for example, it can be set to 1.5 times or more than 2 times the thickness of the main part 112*a*.

Alternatively, as a variation, the snap portion 114 can be provided on only one of the left and right side wall surfaces.

As shown in FIG. 21*d*, a positioning portion 112*d* is provided at the edge in the width direction of the main part 112*a*, and the positioning portion 112*d* has a side portion 112*d*1 and a side portion 112*d*2, with the side portion 112*d*1 extending in a straight line in the length direction of the main part 112*a* and the side portion 112*d*2 extending in a straight line in the width direction of the main part 112*a*. The base plate 11 of the housing 10 is provided with a positioning portion (not shown) that mates with the positioning portion 112*d*, and the positioning portion on the base plate 11 matches the shape of the positioning portion 112*d* so that the high-voltage harness bracket 112 can be positioned in the front and back directions and the left and right directions.

As shown in FIG. 21*b* and FIG. 21*d*, a plurality of mounting holes (not shown) are provided in the main part 112*a*, and bolts 117 can be installed in these mounting holes to fix the high-voltage harness bracket 112 to the base plate 11. In addition, in this embodiment, the mounting holes are provided at the front and back ends of the main part 112*a*.

When installing the high-voltage harness bracket 112, each notched portion 112*c* is aligned with the snap portion 114, and then the high-voltage harness bracket 112 is moved slightly downward so that the snap portion 114 enters the notched portion 112*c*. In this state, the high-voltage harness bracket 112 is moved in the front and back directions so that the positioning portion 112*d* on the main part 112*a* and the positioning portion on the base plate 11 are engaged in the front and back directions, and then the high-voltage harness bracket 112 is adjusted so that the positioning portion 112*d* and the positioning portion on the base plate 11 are engaged in the left and right directions, thereby positioning the high-voltage harness bracket 112 in the front and back directions and the left and right directions. At the same time, the left and right edges of the main part 112*a* are inserted into the snap portion 114 of the base plate 11, so that the movement of the high-voltage harness bracket 112 in the up and down directions is limited by the snap portion 114. In this state, the bolts 117 are inserted through the mounting holes in the main part 112*a* to fix the high-voltage harness bracket 112 to the base plate 11.

As shown in FIG. 21*c*, cushioning members 74 may be placed on each of the left and right sides of the raised part 112*b* of the main part 112*a*, which is clamped by the main part 112*a* and the reinforcing member 72 of the reinforcing component 70 that will be described later (FIG. 12), for cushioning the pressure of the reinforcing component 70, or the reinforcing member 72, on the high-voltage harness bracket 112. The material of the cushioning members 74 is not particularly limited, and it may, for example, be made of a metal, rubber, plastic or felt.

In this embodiment, the high-voltage harness bracket 112 is fixed to the high-voltage harness 51, thereby enhancing the strength of the base plate 11 in the front and back directions. In addition, the flat high-voltage harness 51 is overlapped and fixed with the plate-shaped high-voltage harness bracket 112, which can further enhance the strength.

<Power Distribution Device and Related Structure>

As shown in FIG. 2, FIG. 5, and FIG. 6, the power distribution device 31 is mounted inside the housing 10.

As described above, the power distribution device 31 is used to transfer or transmit electrical energy from the battery pack 100 to other high voltage systems such as the motor 210, 220 or air conditioning compressor (not shown), etc. In this embodiment, as shown in FIG. 2, FIG. 5, FIG. 6, etc., the power distribution device 31 is configured on the rearmost battery module 20L of the plurality of battery modules 20L. The power distribution device 31 may include a relay, a current sensor, a fuse, a pre-charge resistor, etc., wherein the relay may be considered as a high current switch that cuts off the current flowing through the busbar and electrically isolates the high voltage battery from the rest of the high voltage system. The current sensor is used to detect the current flowing through the circuit. The pre-charge resistor is used to protect the system from damage from surge power sources.

In this embodiment, the power distribution device 31 is installed at the rear inside the housing 10. Compared to installing the power distribution device 31 in the middle, for example, this allows maintenance and replacement of the power distribution device 31 to be more easily carried out.

Further, as shown in FIG. 2, a connector 53 is provided at the rear of the housing 10, and the power distribution device 31 is configured at the rear of the housing 10 and is close to the connector 53 so that the wiring length between the power distribution device 31 and the connector 53 is short and can be easily wired. Specifically, since the power distribution device 31 is located close to the connector 53, the length of the high-voltage connection component 50 for connecting the power distribution device 31 and the connector 53 is shorter, and thus the high-voltage connection component 50, even when not provided in the base plate 11, can be less susceptible to impact or crushing caused by the battery module 20. In this way, only one of the high-voltage connection component 50 and the high-voltage connection component 55 needs to be subjected to the complicated operation for installation in the base plate 11, and the other does not need to be subjected to the complicated operation for installation in the base plate 11, thereby enabling easy wiring and reducing installation time.

As shown in FIG. 4, a projection 13a is provided on the upper surface of the rear part of the upper cover 13 of the housing 10, and the inner side of the projection 13a is a concave part for accommodating the power distribution device 31. In this embodiment, the power distribution device 31 is configured near the connector 53 so that the projection 13a accommodating the power distribution device 31 is set at the rear part of the housing 10, so that there are no large protrusions on the front of the housing 10 of the battery pack 100, thereby allowing more space in the cabin corresponding to the location of the battery pack 100 to accommodate the feet of the passenger.

Alternatively, the power distribution device 31 is mounted on the battery module 20 from above. In this way, it is possible to reduce the size of the gap S, reduce the size of the battery pack 100 in the left and right directions, and increase the energy density of the battery pack 100 as compared to configuring the power distribution device 31 in the gap S.

Alternatively, the power distribution device 31 is mounted on a single cell module 20. In this way, compared to the power distribution device 31 being connected across two or more battery modules 20, it is possible to improve the convenience of installation of the power distribution device 31, improve the stability of the power distribution device 31, and reduce the overall space occupied by the power distribution device 31.

In this embodiment, the power distribution device 31 is mounted on a single battery module 20L, and that battery module 20L on which the power distribution device 31 is mounted is the rearmost of the plurality of battery modules 20L. Alternatively, as other embodiments, the power distribution device 31 is not limited to the rearmost battery module 20L, but may also be configured on the other battery modules 20 at the rear. Further, as other embodiments, the power distribution device 31 may also be mounted on the battery module 20R.

Figure 23:
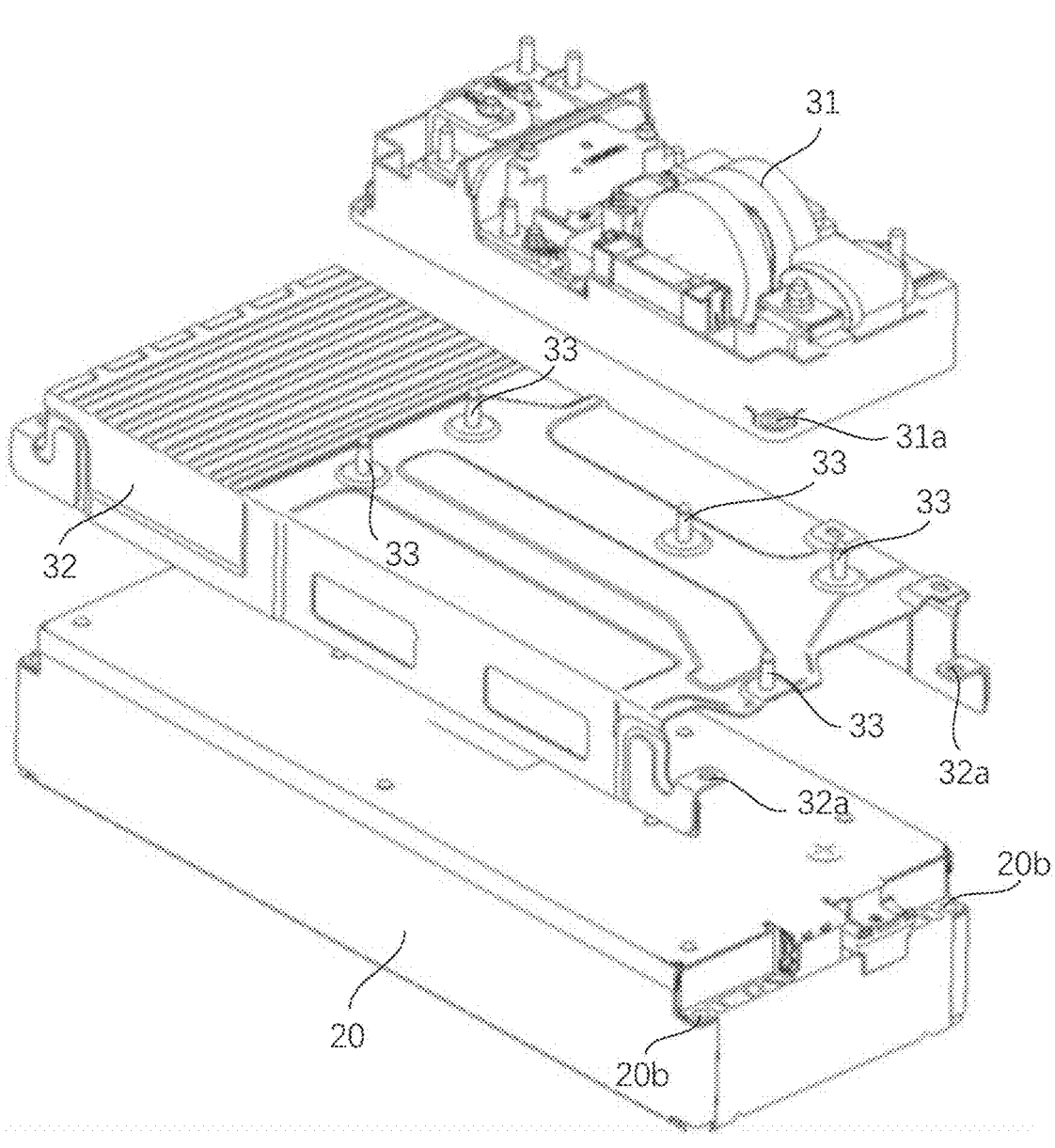
FIG. 23 is a structural schematic diagram of the structure of FIG. 22a in a disassembled state.

FIG. 22a is a schematic diagram of the three-dimensional structure of the combined state of the battery module, the power distribution device bracket and the power distribution device involved in this embodiment; FIG. 22b is a schematic top view of the structure in FIG. 22a; FIG. 23 is a structural schematic diagram of the structure of FIG. 22a in a disassembled state; and FIG. 24 is a schematic diagram of the three-dimensional structure of the power distribution device bracket involved in this embodiment.

As shown in FIGS. 22a and 22b, the power distribution device 31 is mounted on the battery module 20L via the power distribution device bracket 32. In this way, a special bracket is provided to mount the power distribution device 31, which can improve the stability of the power distribution device.

As shown in FIG. 22a and FIG. 24, the power distribution device bracket 32 comprises a top part 321 and side parts 322. The top part 321 is roughly in the shape of a plate to cover the upper surface of the battery module 20. There are two side parts 322 extending downward from each of the front and rear ends of the top part 321 to cover the side surfaces of the battery module 20. By forming such a shape, the top part 321 of the power distribution device bracket 32 fits the upper surface of the battery module 20 and the side parts 322 fit the side surfaces of the battery module 20, and therefore, on the one hand, it is possible to improve the connection strength and to keep the power distribution device 31 in a stable position; on the other hand, it is possible to make the power distribution device bracket 32 compact with the battery module 20, avoiding oversizing of the power distribution device bracket 32, reducing the occupied space, and facilitating the miniaturization of the battery pack 100.

As other embodiments, there may be only one side part 322.

Alternatively, a plurality of mounting holes 32a are provided in the side part 322 for mounting the power distribution device bracket 32 on the battery pack 20.

More specifically, as shown in FIG. 23 and FIG. 25, a plurality of mounting holes 20b are provided in the battery module 20, and as shown in FIG. 15a and FIG. 22a, a bolt 21 passes through the mounting holes 32a and 20b in sequence and is screwed into a nut 22 provided in the base plate 11, so that the power distribution device bracket 32 can be installed on the battery module 20 by using the structure (the bolt 21 and the nut 22) that installs the battery module 20 on the base plate 11, without additional installation structures on the battery module 20, simplifying the structure and reducing the manufacturing cost.

In the present embodiment, the mounting holes 32a are configured above the mounting holes 20b, however, in other embodiments, the mounting holes 32a may be configured below the mounting holes 20b, i.e., the part of the power distribution device bracket 32 with the mounting holes 32a is inserted between the battery module 20 and the base plate 11. It can be seen that "a bolt 21 passes through the mounting holes 32a 20b in sequence" herein is not limited to a bolt 21 passing through the mounting hole 32a and then the mounting hole 20b, but rather a bolt 21 passing through one of the mounting hole 32a and the mounting hole 20b and then the other.

Alternatively, as shown in FIG. 22a, FIG. 22b, FIG. 23 and FIG. 24, a plurality of bolts 33 are provided on the upper surface of the top part 321 of the power distribution device bracket 32 for mounting the power distribution device 31 on the power distribution device bracket 32. Specifically, it is possible to mount the power distribution device on the power distribution device bracket 32 by making the bolts 33 pass through the mounting holes 31a in the power distribution device 31 and screw the nuts 34 on the threaded parts of the bolts.

As shown in FIG. 22a and FIG. 26, wiring terminals 31b, wiring terminals 31c and wiring terminals 31d are provided on the power distribution device 31, and there are two wiring terminals 31b, two wiring terminals 31c and two wiring terminals 31d. Among them, the wiring terminals 31b are used to electrically connect the rear connector 53 through the high-voltage connection component 55 so as to be able to electrically connect the motor 220 at the rear; the wiring terminals 31*c* are used to electrically connect the battery modules 20 in series; and the wiring terminals 31*d* are used to electrically connect the front connector 52 through the high-voltage connection component 50 so as to be able to electrically connect the motor 210 at the front.

As shown in FIG. 22*b*, the dimensions in the front and back directions and in the left and right directions of the power distribution device bracket 32 are roughly the same as those of the battery module 20, and the dimensions in the front and back directions and in the left and right directions of the power distribution device 31 are smaller than those of the power distribution device bracket 32 and the battery module 20, so that it is possible to better set the mounting points of the power distribution device bracket 32, and thus the power distribution device bracket can be more securely fixed above the battery module.

As shown in FIGS. 22*a* and 22*b*, the power distribution device 31 is disposed in the left and right directions near the right end of the power distribution device bracket 32, that is, near the center of the housing 10 or the base plate 11 in the left and right directions. In this way, the wiring length between the power distribution device 31 and the connector 53 or the high-voltage harness 51 can be shortened, saving costs and facilitating wiring.

More specifically, one or more bolts 33 for mounting the power distribution device 31 are provided at the right end of the power distribution device bracket 32, so that the power distribution device 31 can be configured at the right end of the power distribution device bracket 32 in the left and right directions.

In addition, in this embodiment, the bolts 33 are fixed to the upper surface of the power distribution device bracket 32 by welding or integral molding, etc., and the power distribution device 31 is mounted by screwing the nuts 34 from one side of the power distribution device 31. In this way, there is no need to leave space for setting nuts 34, etc. on the lower surface side of the top part 321 of the power distribution device bracket 32, so that the top part 321 can fit the battery module 20 well, which helps to improve the stability of the power distribution device bracket 32 and reduce the space occupied by the power distribution device bracket 32.

Furthermore, as shown in FIG. 22*a*, FIG. 22*b*, FIG. 24, etc., a reinforcing rib 321*a* is provided on the power distribution device bracket 32, so that the strength of the power distribution device bracket 32 can be improved and the stability of the power distribution device 31 can be improved. In addition, the reinforcing rib 321*a* is located at the top 321 in an area that avoids the configuration of the power distribution device 31, thereby, for example, firmly fixing the power distribution device 31 on the power distribution device bracket 32. In this embodiment, there are a plurality of reinforcing ribs 321*a* extending in the front and back directions and in a straight line. It is understood that other forms of reinforcing ribs can be provided, such as reinforcing ribs extending in the left and right directions, or curved reinforcing ribs.

<Control Device and Related Structure>

As shown in FIG. 3, FIG. 12 and FIG. 15*a*, the control device 41 of the battery management system BMS) and the low-voltage harness 61 are configured in the gap S between the battery modules 20L and the battery modules 20R inside the housing 10.

As shown in FIG. 5, a plurality of control devices 41A, 41B and 41C (in the description herein, the plurality of control devices are collectively referred to as a control device 41 when no distinction is made between the plurality of control devices) of the battery management system are disposed between the battery modules 20L and the battery modules 20R in the housing 10. The control devices 41A, 41B, and 41C are arranged in order from front to back. The control devices 41A, 41B, and 41C may be composed of electronic control units (ECUs). In this embodiment, the control devices 41A and 41B are battery information collectors (BICs) and the control device 41C is a battery management unit (BMU). These control devices 41A, 41B and 41C constitute a battery management system for intelligently managing and maintaining each battery module, preventing overcharging and overdischarging, extending the service life, monitoring the battery status, etc.

It will be understood that the number and form of the control devices described above are merely illustrative and do not constitute a limitation of the present invention.

Figure 28A:
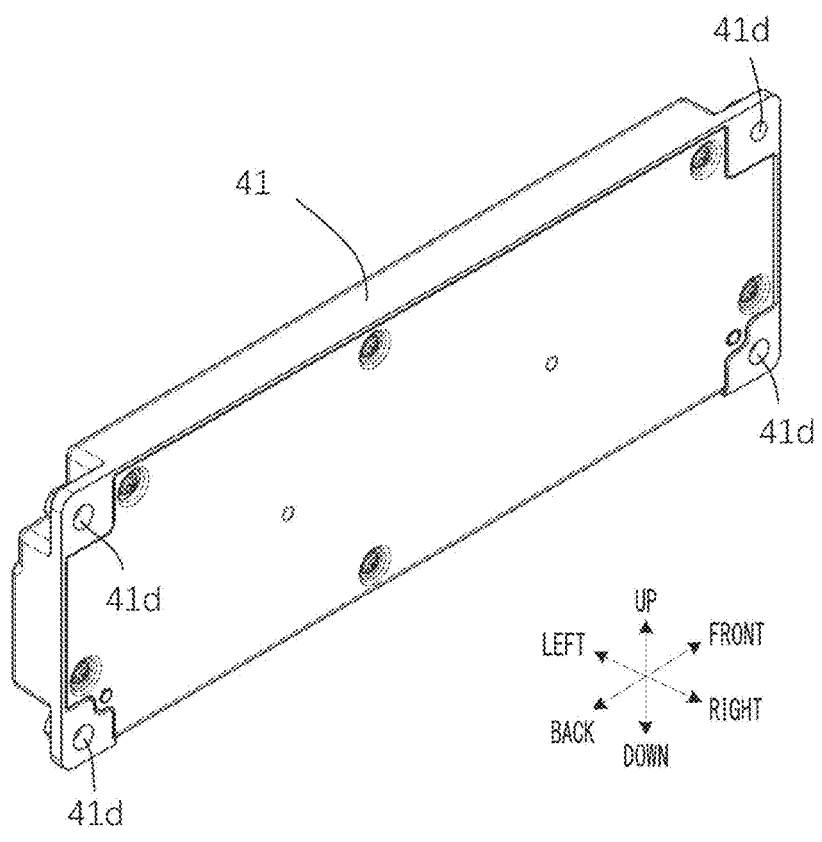
FIG. 28a is a schematic diagram of a three-dimensional structure of a control device in an embodiment of the present invention.
Figure 28B:
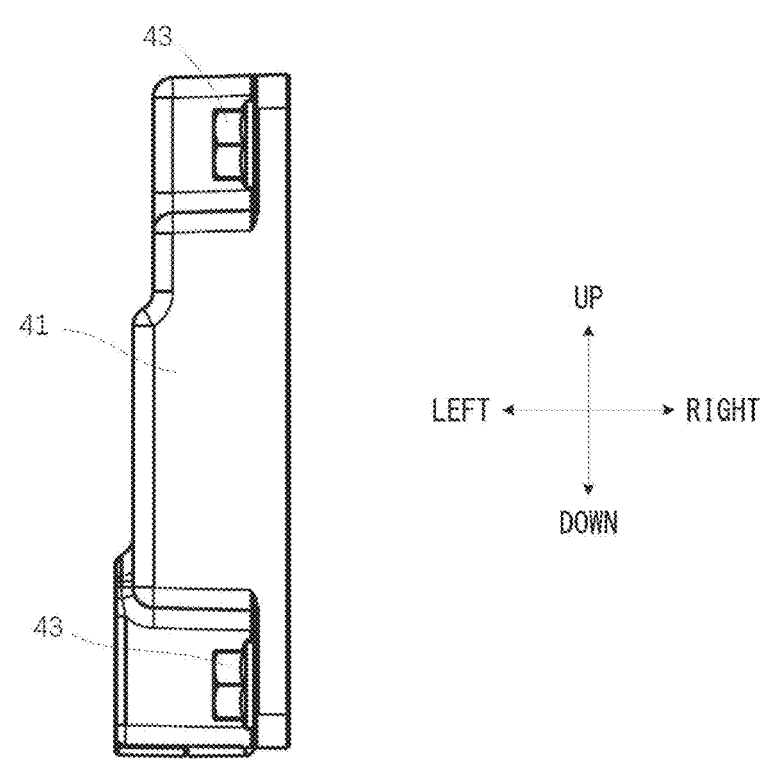
FIG. 28b is a schematic side view of the control device.
Figure 28C:
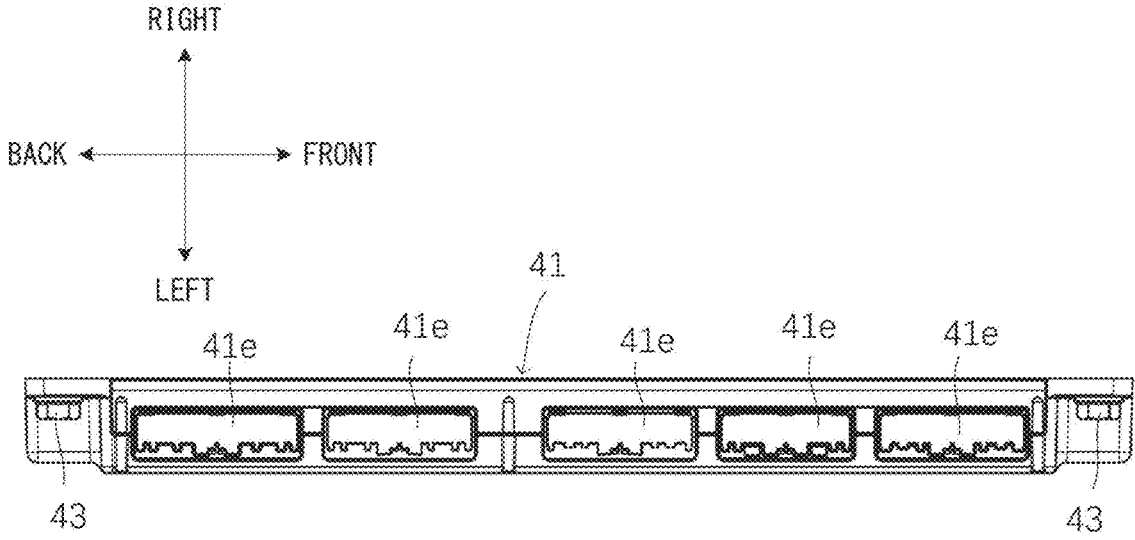
FIG. 28c is a schematic bottom view of the control device.
Figure 28D:
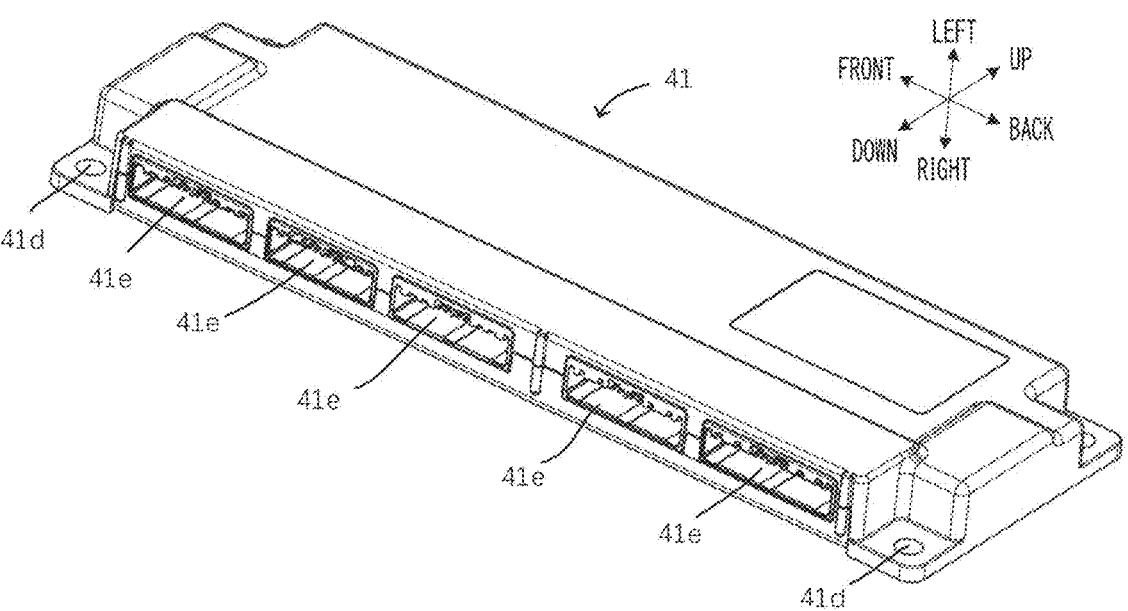
FIG. 28d is another schematic diagram of a three-dimensional structure of the control device.

FIG. 28*a* is a schematic diagram of a three-dimensional structure of a control device in this embodiment; FIG. 28*b* is a schematic side view of the control device; FIG. 28*c* is a schematic bottom view of the control device; and FIG. 28*d* is another schematic diagram of a three-dimensional structure of the control device. As shown in FIG. 15*a*, FIG. 16, FIG. 17, FIG. 28*a*, FIG. 28*b*, FIG. 28*c* and FIG. 28*d*, the control device 41 is substantially rectangular in shape with a thickness direction substantially in line with the left and right directions, with the long side configured in the front and rear directions and the short side configured in the up and down directions.

Because the smallest size is in the thickness direction, followed by the short side direction, and the largest size is in the long side direction, it is possible to miniaturize the battery pack 100 by making the thickness direction consistent with the left and right directions, thereby reducing the size in the left and right directions of the gap S.

In addition, configuring the short side in the up and down directions enables the height of the control device 41 to be reduced compared to when the long side is configured in the up and down directions, thereby suppressing the size of the battery pack 100 in the up and down directions and facilitating miniaturization.

Further, since the gap S is long in size in the front and back directions (the direction in which the plurality of battery modules 20L or 20R are aligned), even though the long side of the control device 41 is configured in the front and back directions, it does not cause the battery pack 100 to increase in size in the front and back directions, facilitating miniaturization.

As shown in FIGS. 15*a* and 17, the control device 41 is mounted on the high-voltage harness bracket 112 via the control device bracket 42. In this way, the control device 41 is mounted using the high-voltage harness bracket 112 of the high-voltage harness 51, thereby enabling a simple and compact structure that facilitates miniaturization of the battery pack 100. As an example of the mounting method, in this embodiment, the control device 41 is fixed to the control device bracket 42 by bolts 43 as shown in FIG. 15*a*.

As shown in FIG. 15*a*, the control device bracket 42 comprises a main part 42*a* and a base part 42*b*. The main part 42*a* is provided vertically for mounting the control device 41, and the base part 42*b* is bent from the lower end of the main part 42*a* so as to extend in the left and right directions for mounting on the high-voltage harness bracket 112. For example, the base part 42*b* is fixed to the high-voltage harness bracket 112 by bolts which are not shown. It will be understood that the base part 42*b* may also be fixed to the high-voltage harness bracket by other means, such as by welding.

In this way, the control device bracket 42 overall has substantially an L shape (in this embodiment, an L shape viewed from the rear), thereby having the technical effect of taking up less space and improving the space utilization inside the battery pack 100. In addition, having a base part 42b extending from the lower end of the main part 42a in the left and right directions, it is possible to securely mount the control device bracket 42 on the high-voltage harness bracket 112.

As shown in FIGS. 28c and 28d, the control device 41 has a connector 41e, which is located in the lower part of the control device 41 (interface) facing downward. Alternatively, the control device 41 is configured with the connector 41e facing downward. A connector 65 that will be described later on the low-voltage harness 61 is mated to the connector 41e from below to collect voltage, temperature and other information from the battery module 20. With the connector 41e located in the lower part of the control device 41, it is possible to have a good waterproof effect. Specifically, since dew will form on the control device 41 and its surrounding area due to dew condensation inside the housing 10 as a result of heating and cooling of the battery module 20, it is understood that the dew will flow downward, and thus, by setting the connector 41e in the lower part of the control device 41 and making it face downward, it is possible to prevent water generated from dew from flowing into the connector 41e and causing corrosion and other problems of the connector 41e.

Here, the connector 41e facing downward does not necessarily mean that it faces strictly vertically downward, but it may be angled downward, with the connector 41e facing downward and at an angle of greater than or equal to 0 but less than or equal to 90 degrees from the horizontal direction. As other embodiments, the angle may also be greater than or equal to 0 but less than or equal to 10 degrees, or greater than or equal to 0 but less than or equal to 30 degrees, 45 degrees, or 60 degrees. It is understood that the closer the angle is to the horizontal direction, the better the waterproofing effect. Alternatively, the connector 41e may be at an angle of 0 degrees to the horizontal direction. In addition, in the example of FIG. 28c, the control device 41 has a plurality of connectors 41e, and it is understood that the number of connectors 41e may vary depending on the function of the control device 41.

Further, as shown in FIG. 15a, FIG. 17 and FIG. 21a, a harness fixing portion 42c is provided in the middle of the up and down directions of the main part 42a of the control device bracket 42 for fixing a branch wire portion 612 of the low-voltage harness 61 that will be described later. Specifically, the harness fixing portion 42c extends from the middle in the up and down directions of the main part 42a to the front and back directions, and a through-hole in which an embedded portion of the ring bracket 44 on the branch wire portion 612 is embedded is provided thereon, thereby fixing the branch wire portion 612 to the harness fixing portion 42c.

In this way, on the one hand, since the branch wire portion 612 of the low-voltage harness 61 is fixed in the middle in the up and down directions of the main part 42a, it is possible to keep its position stable and keep its connection to the battery module 20 stable, so that the battery pack 100 has stable performance; on the other hand, since the control device bracket 42 is used to fix the low-voltage harness 61, it is possible to simplify the structure and make the structure compact, which facilitates the installation of the control device 41 and the low-voltage connection component 60 in a limited space, facilitating the miniaturization of the battery pack 100.

In this embodiment, the branch wire portions 612 among the plurality of branch wire portions 612 that are electrically connected to the battery modules 20R on the right side are fixed by the harness fixing section 42c.

As shown in FIG. 15a, etc., the control device bracket 42 (base part 42b) is fixed to the right side part of the high-voltage harness bracket 112, such that the control device 41 is configured substantially rightward from the middle in the gap S.

<Low-Voltage Connection Component and Related Structure>

Referring to FIG. 3, FIG. 12 and FIG. 15a, the low-voltage connection component 60 is configured in the gap S between the battery modules 20L and the battery modules 20R inside the housing 10 as described above.

The low-voltage connection component 60 comprises a low-voltage harness 61 with a low-voltage harness bracket 62, etc. The low-voltage harness 61 is mounted on the base plate 11 by means of the low-voltage harness bracket 62 on the high-voltage harness bracket 112, and thereby is located above the high-voltage harness bracket 112. Since the low-voltage harness 61 is mounted on the high-voltage harness bracket 112 through the low-voltage harness bracket 62, i.e., the high-voltage harness bracket 112 of the high-voltage harness 51 is used to mount the low-voltage harness 61, it is thereby possible to make the structure simple and compact, which facilitates the miniaturization of the battery pack 100. Further, during assembly, the low-voltage harness 61 and the high-voltage harness 51, etc., can be mounted together and treated as a single unit, thereby enabling easy assembly.

As other embodiments, the low-voltage harness bracket 62 can also be mounted directly on the base plate 11.

As shown in FIG. 16, etc., the low-voltage connection component 60 is configured to the left of the control device 41 in the left and right directions. That is, the control device 41 is roughly configured from the middle to the right in the gap S, and the low-voltage connection component 60 is roughly arranged from the middle to the left in the gap S. In the left and right directions, the control device 41 is configured between the right battery modules 20R and the low-voltage connection component 60 (low-voltage harness 61), and the low-voltage connection component 60 is configured between the control device 41 and the left battery modules 20L. It will be understood that, as other embodiments, the left and right positions of the low-voltage connection component 60 and the control device 41 may be interchangeable.

Alternatively, as shown in FIG. 12, FIG. 16, etc., the low-voltage connection component 60 is configured at a lower position than the control device 41 in the up and down directions. That is, in this embodiment, the low-voltage connection component 60 is configured on the lower left side of the control device 41. Additionally, referring to FIG. 12, FIG. 16, etc., the low-voltage harness 61 has a bent portion, which is bent to the right (or convex to the right), near the reinforcing member 72 of the reinforcing component 70, so that this part of the low-voltage harness 61 is offset to the right relative to its adjacent part to avoid interference with the reinforcing member 72. Thus, for example, it is possible to obtain the technical effect of avoiding interference between the reinforcing member 72 and the low-voltage harness 61 and avoiding wear of the reinforcing member 72 by the low-voltage harness 61.

In addition, in this embodiment, the high-voltage connection component 50 is configured in the holding portion 113 and the low-voltage connection component 60 is configured outside the holding portion 113, thereby, for example, making use of the limited space in the base plate 11 to improve the safety of the battery pack 100 as efficiently as possible.

Figure 18:
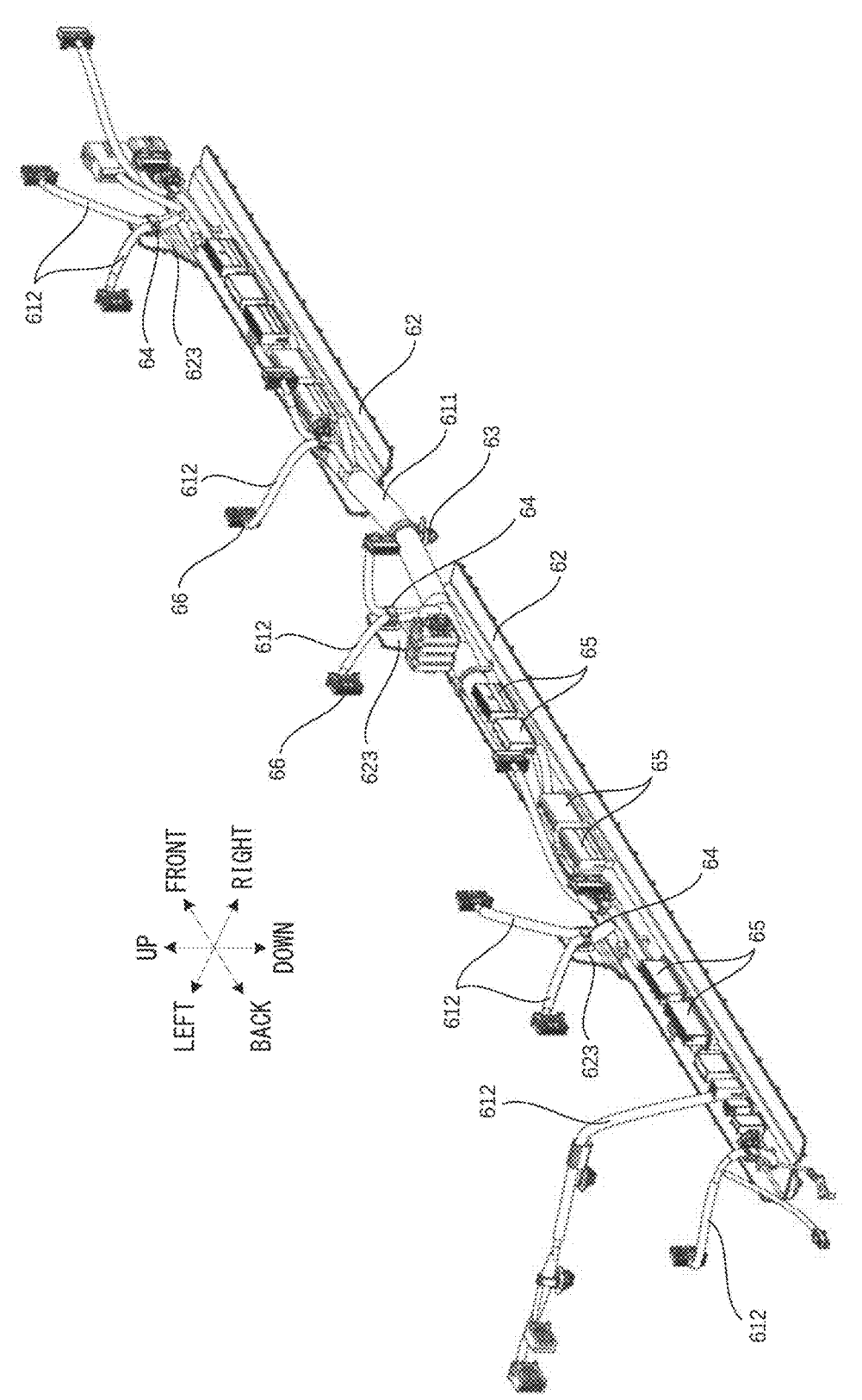
FIG. 18 is a schematic diagram of the combined state of the low-voltage connection component involved in an embodiment of the present invention.

As shown in FIG. 18, etc., the low-voltage harness 61 comprises a main wire portion 611 and a plurality of branch wire portions 612. The main wire portion 611 extends in front and back directions. The plurality of branch wire portions 612 are electrically connected to the main wire portion 611. Specifically, the main wire portion 611 and the plurality of branch wire portions 612 are arranged between the control device 41 and the battery module 20, and the connector 65 is arranged below the control device 41. In this way, there is more space to set the connection between the branch wire portions 612 and the connector 65, thereby preventing the branch wire portions 612 from being easily broken and prolonging the life of the branch wire portions 612. In addition, because only the space for setting the connector is required under the control device 41 and the branch wire portions 612 do not occupy the space under the control device 41, the height of the control device 41 can be reduced, and the housing of the battery pack has a smaller height dimension for housing the control device 41, which contributes to the miniaturization of the battery pack.

Here, the connector 65 is used to connect the control device 41; and the connector 66 is used to connect the battery module 20. Since the wiring port 20*c* of the battery module 20 is set in the upper part of the battery module 20 at a higher position, the branch wire portion 612 with the connector 66 extends upward to enable the connector 66 to be plugged into the wiring port 20*c* of the battery module 20.

The connector 65 is supported on the low-voltage harness bracket 62 so that it can remain at a stable position.

Figure 19:
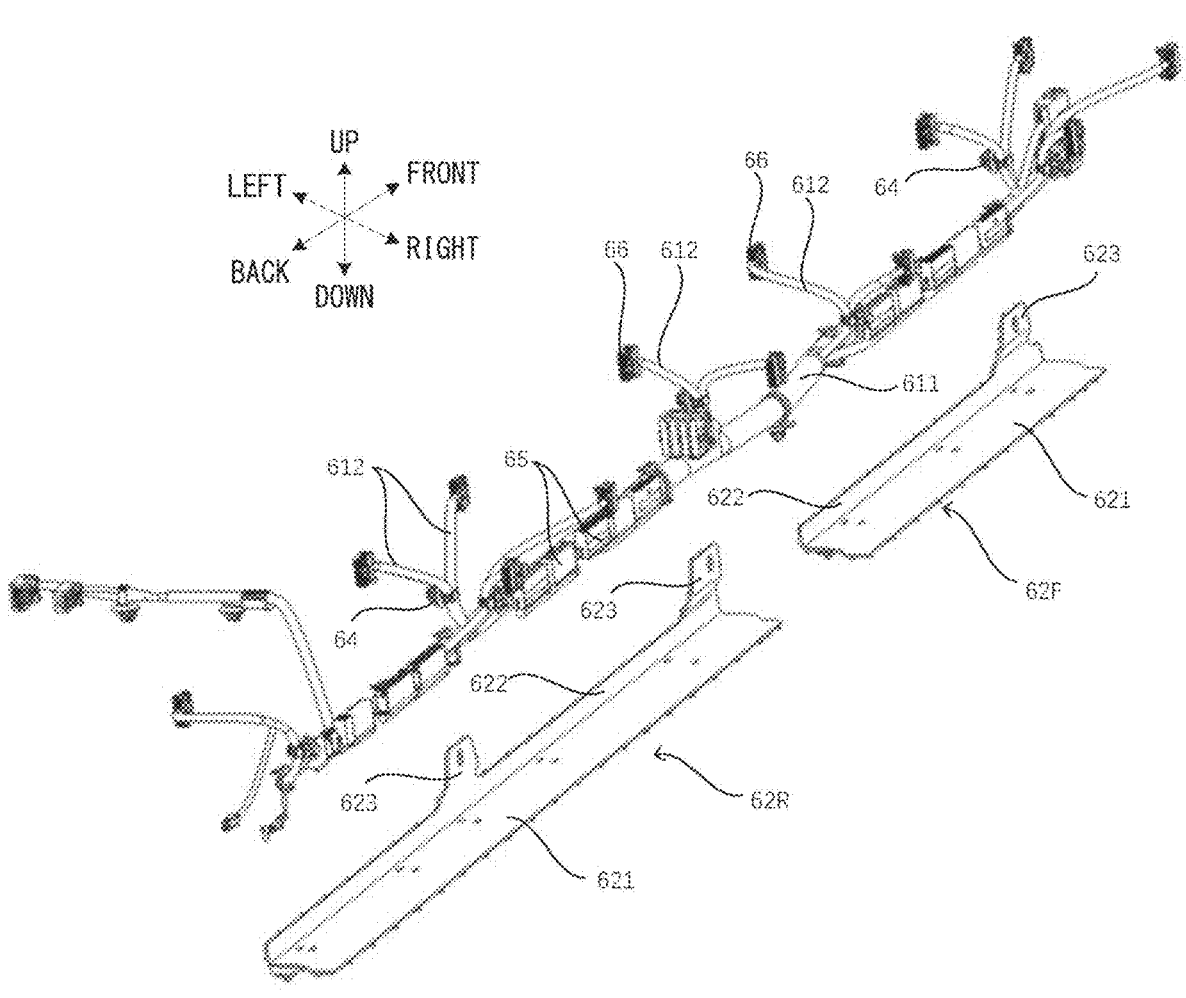
FIG. 19 is a schematic diagram of the structure in FIG. 18 in a disassembled state.
Figure 20:
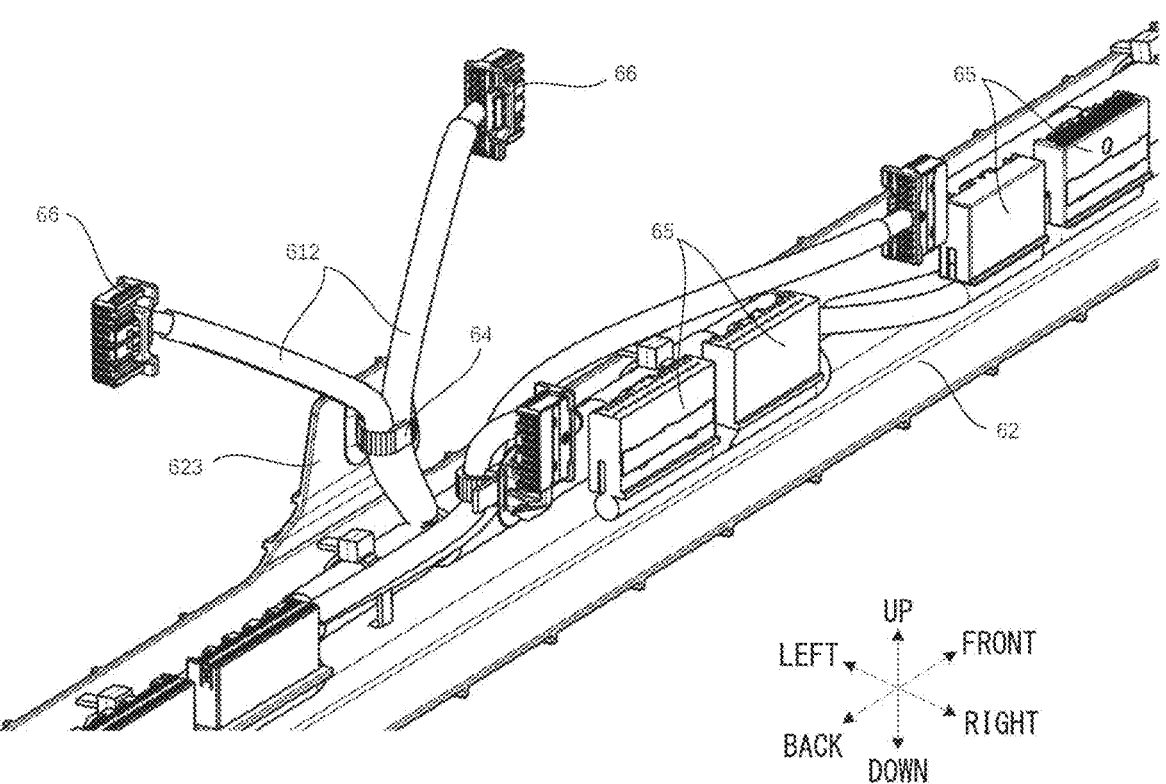
FIG. 20 is a partially enlarged view of the structure in FIG. 18.

As shown in FIG. 18, FIG. 19, etc., there are two low-voltage harness brackets 62, namely, a low-voltage harness bracket 62F and a low-voltage harness bracket 62R, which are arranged in front and back directions. In particular, the low-voltage harness bracket 62F is configured in front of the reinforcing component 70 and the low-voltage harness bracket 62R is configured at the rear of the reinforcing component 70. The low-voltage harness bracket 62F and the low-voltage harness bracket 62R are spaced apart to avoid the reinforcing component 70, preventing the reinforcing component 70 from causing a larger opening 72*e* (FIG. 12) and thereby causing a reduction in strength when avoiding the low-voltage harness bracket 62. The rearward low-voltage harness bracket 62R is relatively long and corresponds to part of the low-voltage harness 61 of both control devices 41; the forward low-voltage harness bracket 62F is relatively short and corresponds to part of the low-voltage harness 61 of one control device 41. Here, the "F" and "R" in the attached markings "62F" and "62R" are used to indicate "front" and "rear", respectively, and both are collectively referred to as the low-voltage harness bracket 62 when no distinction is made between front and rear.

The low-voltage harness bracket 62 comprises a main part 621 and a wire harness fixing portion 623. The main part 621 is in the form of a plate and is arranged substantially horizontally to support the main wire portion 611 and connector 65 of the low-voltage harness 61. The wire harness fixing portion 623 extends upwards by bending from the left and right ends of the main part 621 (in this embodiment, from the left end), and is used to fix part of the multiple branch wire portions 612 of the low-voltage harness 61. Specifically, the wire harness fixing portion 623 is used to fix the branch wire portions 612 of the plurality of branch wire portions 612 that are electrically connected to the battery modules 20L on the left side. Regarding the specific fixing method, for example, a through hole can be set on the wire harness fixing portion 623, and an insertion part of the ring bracket 64 sleeved on the branch wire portion 612 can be embedded in the through hole, thereby fixing the branch wire portion 612 on the wire harness fixing portion 623.

In this way, the branch wire portion 612 of the low-voltage harness 61 is fixed at the upwardly extending position of the wire harness fixing portion 623, thus it is possible to keep the position of the branch wire portions 612 stable and keep its connection to the battery module 20 stable, making performance of the battery pack 100 stable.

Referring to FIG. 16, a raised part 112*b* is provided on the high-voltage harness bracket 112 that rises upward and is located in the up and down directions opposite the gap between the forward low-voltage harness bracket 62 and the rearward low-voltage harness bracket 62. The portion between the forward low-voltage harness bracket 62 and the rearward low-voltage harness bracket 62 of the main part 611 of the low-voltage harness 61 is supported by the raised part 112*b*, and is also fixed to the raised part 112*b*. Specifically, a through hole is provided on the raised part 112*b*, and an insertion part of the ring bracket 63 sleeved in the middle of the main part 611 (specifically the bending part) is embedded in the through hole, thereby fixing the main part 611 on the high-voltage harness bracket 112.

In this way, since the main wire portion 611 is supported by the raised part 112*b* of the high-voltage harness bracket 112 at a position where the low-voltage harness bracket 62 cannot be supported, the position of the low-voltage harness 61 (main wire portion 611) is effectively kept stable, and the safety and performance stability of the battery pack 100 are improved.

The ring brackets 44, 63, and 64 may be made of a metal or may be made of a plastic.

Alternatively, as other embodiments, the low-voltage harness 61 may be fixed to the high voltage harness bracket 112.

<Reinforcement Components and Related Structures>

As shown in FIGS. 6 to 8, a reinforcing component 70 is provided within the housing 10, is configured in the middle of the front and back directions within the housing 10, and extends in the left and right directions, mainly for strengthening the housing 10 in the left and right directions. For example, when the vehicle 200 is subjected to a lateral impact, the reinforcing component 70 can resist the lateral impact force, suppressing the deformation of the housing 10, as well as damage caused by the impact to the battery module 20 inside the housing 10. In this embodiment, one reinforcing component 70 is provided, however, as other embodiments, a plurality of reinforcing components spaced apart and arranged in the front and back directions may be provided. In this embodiment, the reinforcing component 70 may also be referred to as a beam.

In this embodiment, the reinforcing component 70 is supported on the upper surface of the base plate 11, i.e. is located above the base plate 11. Thus, the reinforcing component 70 can be prevented from interfering with the holding portion 113 or the coolant channels 115 in the base plate 11. Compared with the structure in which the reinforcing parts are provided below the plate 116 or at approximately the same height, it is not necessary to provide an avoidance part on the reinforcing component 70 or on the holding portion 113 and the coolant passage 115 to avoid interference, thus making it possible to simplify the structure and reduce the manufacturing cost. Also, as described above, in this embodiment, the holding portion 113 is formed in the shape of a long slot extending in the front and back directions, and the reinforcing component 70 extends in the left and right directions, and thereby the reinforcing component 70 extends crosswise with the holding portion 113. Alternatively, the reinforcing component 70 may be said to extend in the extending direction of the plate 116 or along the upper surface of the plate 116.

Figure 10:
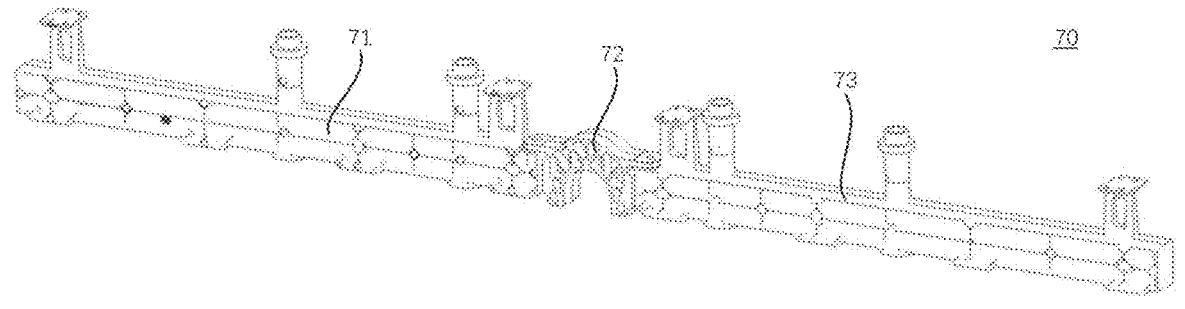
FIG. 10 is a schematic diagram of the three-dimensional structure of the reinforcing member involved in an embodiment of the present invention.

FIG. 10 is a schematic diagram of the three-dimensional structure of the reinforcing component involved in this embodiment. As shown in FIGS. 6 to 8 and FIGS. 10 to 12, the reinforcing component 70 comprises a first connection component 71, a second connection component 73, and a reinforcing member 72. The first connection component 71 is supported on the base plate 11 of the housing 10 and extends from the left side plate 12 toward the middle in the left and right directions. The second connection part 73 is supported on the base plate 11 and extends from the right side plate 12 towards the middle in the right and left directions. A spacer is provided between the first connection component 71 and the second connection component 73. The reinforcing member 72 extends in the left and right directions and is connected between the first connection component 71 and the second connection component 73, having an upwardly convex arch structure to avoid the low-voltage harness 61, etc., configured in the gap S. One end of each of the first connection component 71 and the second connection component 73 is connected to the reinforcing member 72, and the other end of each may be connected to the side plate 12 of the housing 10.

By providing the arch-shaped reinforcing member 72, for example, it is possible to ensure the strength of the reinforcing component 70 based on avoiding the low-voltage harness 61, etc., compared to providing openings in the reinforcing member to avoid the low-voltage harness.

As shown in FIG. 12, the reinforcing member 72 has an overall generally inverted U shape and comprises an arch portion 72a, a vertical portion 72b, and a fixed portion 72c. The arch portion 72a corresponds to the middle portion of the U shape, and its upper and lower surfaces are curved upward and arched upward so as to have an arch shape. There are two vertical parts 72b that extend downward from the left and right ends of the arched portion 72a opposite to the first connection component 71 and the second connection component 73 in the left and right directions. That is, the vertical portions 72b coincide with the first connection component 71 and the second connection component 73 when viewed in the left and right directions. In this way, when the vehicle is subjected to a lateral collision, for example, the vertical portions 72b abut the first connection component 71 and the second connection member 73 in the left and right directions, and reliably transmit the force from one of the first connection component 71 and the second connection component 73 to the arch portion 72a above, and from the arch portion 72a to the other of the first connection component 71 and the second connection component 73, thereby effectively increasing the strength of the reinforcing component 70 as a whole, i.e., increasing the resistance of the reinforcing component 70 against external forces.

An opening 72e is formed by the inner surfaces of the arch portion 72a and the two vertical portions 72b, in which the low-voltage harness 61 and the raised portion 112b of the high-voltage harness holder 112 are accommodated.

There are two fixing portions 72c, which protrude from the connection position of the arch portion 72a and the vertical portion 72b to the outer part in the left and right directions and are fixed to the first connection component 71 and the second connection component 73 by means of bolts 16d. In this way, when the vehicle is subjected to a lateral collision, for example, the force can be effectively transmitted to the arch portion 72a by the first connection component 71 or the second connection component 73, and the overall strength of the reinforcing component 70 can be effectively improved, i.e., the resistance of the reinforcing component 70 to external forces can be improved.

The bolt 16d is provided vertically through the fixing portion 72c, the first connection component 71, the second connection component 73 and the plate 116, and the penetrating lower end is screwed with a nut 16e, so that not only is the fixing portion 72c fixed to the first connection component 71 and the second connection component 73, but also the first connection component 71 and the second connection component 73 are fixed to the base plate 11. In this way, the reinforcing member 72 is fixed to the first connection component 71 and the second connection component 73 using a structure by which the first connection component 71 and the second connection component 73 are fixed to the base plate 11, thereby simplifying the structure and reducing the cost, and also making the structure compact and conducive to the miniaturization of the battery pack 100.

In addition, a plurality of grooves 72d are provided on the arch portion 72a and the vertical portion 72b, specifically, the grooves 72d are triangular recesses. Thus, the weight of the reinforcing member 72 is reduced while the strength of the reinforcing member 72 is guaranteed.

In this embodiment, as shown in FIG. 12, the lower end 72b1 of the vertical portion 72b extends downward into the holding portion 113 so that, for example, when the vehicle is subjected to a lateral impact, the holding portion 113 is deformed by contraction in the left and right directions, at which time the left and right side walls of the holding portion 113 (i.e., the left and right side walls of the recess) contact the lower end 72b1 of the vertical portion 72b, so that the reinforcing member 72 is used to withstand the external force in the left and right directions, thereby increasing the strength of the base plate 11 in the left and right directions. The base plate 11 is strengthened in the left and right directions by the reinforcing member 72 to withstand the external force in the left and right directions.

In addition, in this embodiment, the side portion of this lower end 72b1 is in contact with the left and right edges of the holding portion 113 (edges of the opening 116a of the plate 116, FIG. 15b), thereby reliably improving the strength of the base plate 11 in the left and right directions. Here, the edges of the openings 116a are part of the sidewalls of the holding portion 113, and it is understood that the lower end 72b1 of the vertical portion 72b can be further extended downward while increasing the contact area or contactable area with the sidewalls of the holding portion 113 to further improve the strength of the base plate 11.

Further, as described above, the reinforcing member 72 is pressed on the high-voltage harness bracket 112, specifically the lower end 72b1 of the vertical portion 72b of the reinforcing member 72 is pressed in the middle of the lengthwise direction of the main part 112a of the high-voltage harness bracket 112, so that the displacement or deformation of the high-voltage harness bracket 112 in the up and down directions can be suppressed. Further, as described above, the reinforcing member 72 is pressed on the main part 112a of the high-voltage harness bracket 112 by the cushioning members 74 (FIG. 21c), and specifically the lower ends 72b1 of the vertical portion 72b are pressed on the main part 112a of the high-voltage harness bracket 112 by the cushioning members 74, so that damage to the high-voltage harness bracket 112 can be suppressed.

In this embodiment, the reinforcing member 72, the first connection component 71 and the second connection component 73 are molded separately, however, the invention is not limited to this, for example, the reinforcing member 72 can also be molded in one piece with the first connection component 71 and/or the second connection component 73.

Figure 30:
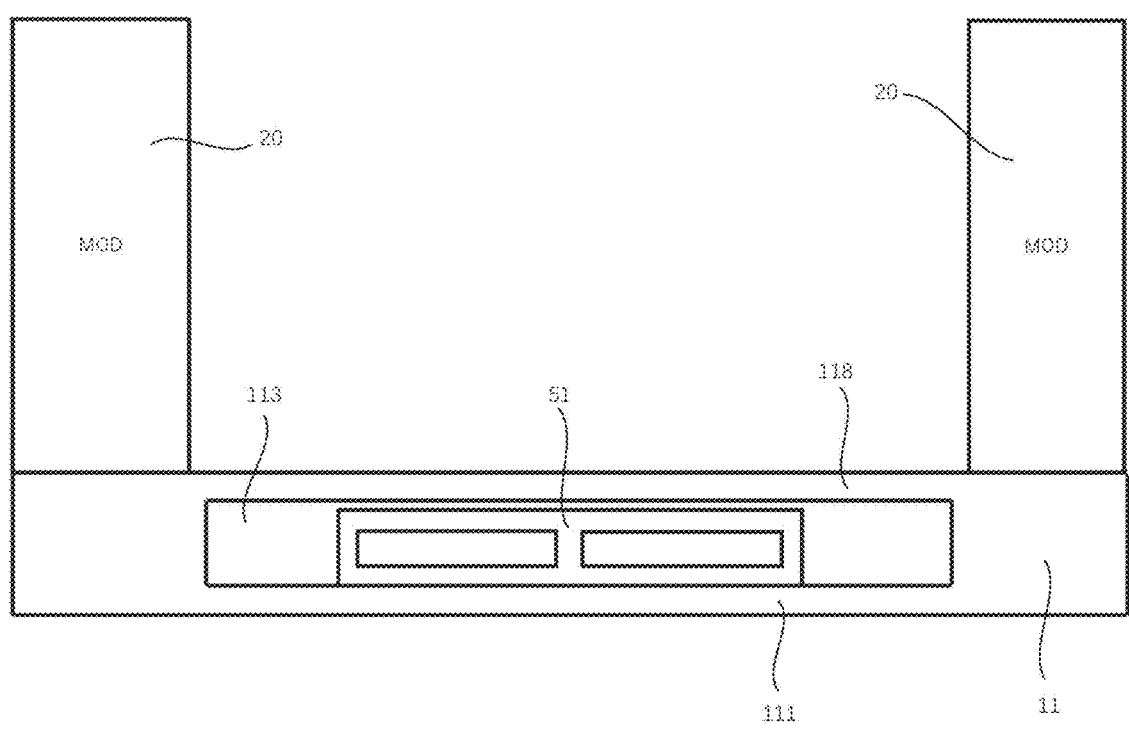
FIG. 30 is a schematic diagram of the structure of a battery pack involved in an embodiment of the present invention, the structure of which differs from that of the embodiment illustrated in FIG. 4.

FIG. 30 is a schematic diagram of the structure of the battery pack involved in another embodiment of the present invention. The difference between the embodiment shown in FIG. 30 and the above embodiment is that, in the above embodiment, an opening 116a is provided in the plate 116, whereas in FIG. 30, instead of the plate 116, the structure is provided with a plate 118 (an example of the first plate), which is approximately equal in size to the plate 111 in the left and right directions, does not have an opening in the position opposite the holding portion 113 and forms the top of the holding portion 113. Further, the holding portion 113 runs through the front and/or rear portions of the base plate 11, i.e., in this embodiment, the holding portion 113 is formed in the form of an elongated hole extending in the front and back directions. During assembly, the high-voltage harness 51 can be inserted into the holding portion 113 from the front or the rear through the opening of the holding portion 113 (long hole). Also, in this embodiment, the high-voltage harness bracket 112 in the above embodiment is omitted. Furthermore, in this embodiment, in the state where the high-voltage harness 51 is inserted into the holding portion 113, the high-voltage harness 51 has a portion that is horizontally exposed outside of the holding portion 113, and this portion can be fixed to the base plate 11 to fix the high-voltage harness 51 to the base plate 11.

Figure 31A:
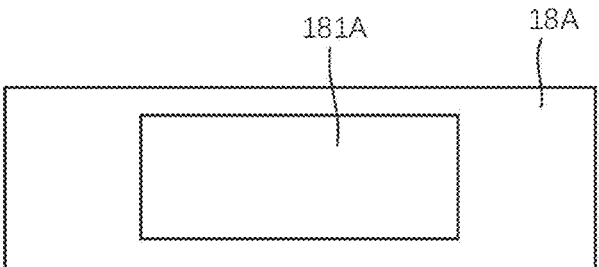
FIGS. 31a to 31f show some examples of a base plate and a holding portion in the base plate.

Some examples of a base plate and a holding portion in the base plate are illustrated in FIGS. 31a to 31f by way of partial cross-sectional diagrams. In FIG. 31a, the housing 10 of the battery pack 100 has a base plate 18A, in which a holding portion 181A composed of a cavity is provided. In addition, in this structure, the base plate 18A has a thicker plate thickness (larger than the dimension of the holding portion 181B in the up and down directions) or, alternatively, a thickened portion can be provided on the base plate 18A, with a thickness greater than that of the portion adjacent thereto, and the holding portion 181A can be provided in the thickened portion.

Figure 31B:
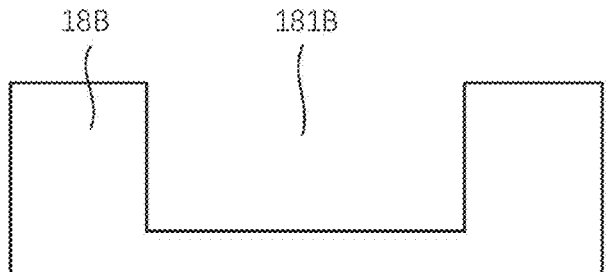

In FIG. 31b, the housing 10 has a base plate 18B, and there is a groove on the upper surface of the base plate 18B, which forms the holding portion 181B. In this structure, the base plate 18B has a thicker plate thickness (larger than the dimension of the holding portion 181B in the up and down directions), or a thickened portion can be provided on the base plate 18B, with a thickness greater than that of the portion adjacent thereto, and the holding portion 181B can be provided in the thickened portion. Similarly, a recess (not shown) is provided on the lower surface of the base plate 18B, and the recess constitutes the holding portion.

Figure 31C:
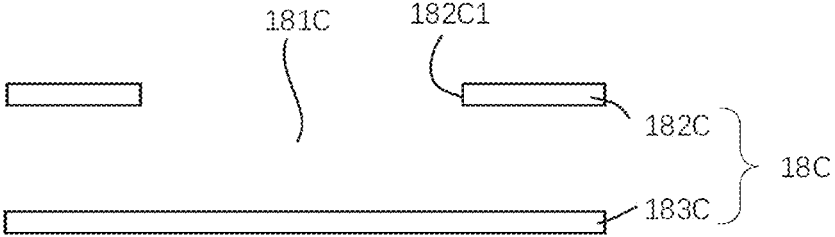

In FIG. 31c, the housing 10 has a base plate 18C, and the base plate 18C has a plate 182C and a plate 183C, which are arranged at relative positions in the up and down directions and separated by intervals. A through opening 182C1 is provided in the upper plate 182C, and a holding portion 181C is formed between the plate 182C and the plate 183C. The high-voltage connection component 50 can be configured in the holding portion 181C through the opening 182C1. The high-voltage connection component 50 can be configured in the holding portion 181C through the opening 182C1. With such a structure, the dimension in the left and right directions of the holding portion 181C can be larger and can accommodate a high-voltage connection component with a larger dimension in the left and right directions. Alternatively, the dimension in the left and right directions of the opening 182C1 may be smaller than that of the high-voltage connection component 50. Similarly, a through opening (not shown) is provided in the lower plate 183C to form a holding portion between the plate 182C and the plate 183C.

Figure 31D:
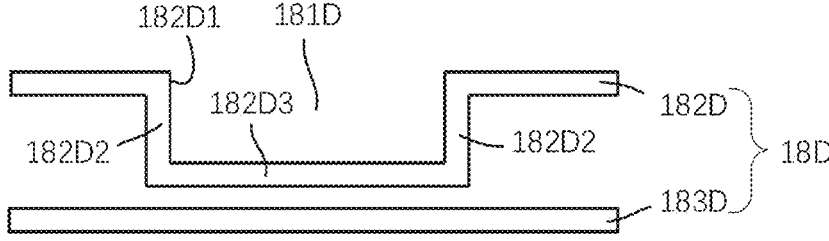

In FIG. 31d, the housing 10 has a base plate 18D, and the base plate 18D has plates 182D and 183D, which are arranged at relative positions in the up and down directions and separated by intervals. The upper surface of the upper plate 182D is provided with a recess, which is raised when viewed from one side of the lower surface of the plate 182D, from which the holding portion 181D is formed. With such a structure, the recess (raised) can be considered as a reinforcing rib (similar to a pressed rib) on the plate 182D, and thus the strength of the plate 182D and the base plate 18D can be improved.

Further, as shown in FIG. 31d, the holding portion 181D (recess) has an opening 182D1, partitioning walls 182D and a bottom wall 182D3. The opening 182D1 is set on the plate 182D, the partitioning walls 182D2 extend from the left and right edges of the opening 182D1 toward the plate 183D, that is, they extend downward, and the bottom wall 182D3 is connected between the left and right partitioning walls 182D2.

Figure 31E:
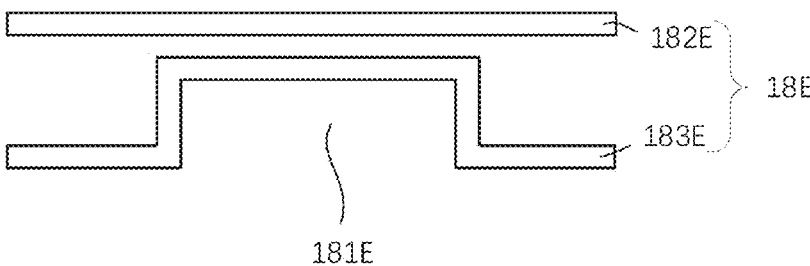

In FIG. 31e, the housing 10 has a base plate 18E, and the base plate 18E has a plate 182E and a plate 183E, which are arranged at relative positions in the up and down directions and separated by intervals. The lower surface of plate 183E is provided with a recess, which is a projection when viewed from one side of the upper surface of the plate 183E, from which the holding portion 181E is formed. Furthermore, the projection may be spaced apart from plate 182E or may be in contact with the plate 182E.

Figure 31F:
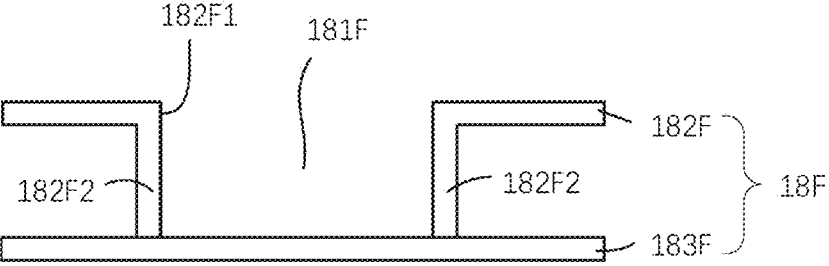

In FIG. 31f, the housing 10 has a base plate 18F, and base plate 18F has a plate 182F and a plate 183F, which are arranged at relative positions in the up and down directions and separated by intervals. The upper plate 182F is provided with a through opening 182F1, and the left and right edges of the opening 182F1 are provided with partitioning walls 182F2 extending downward, so that the holding portion 181F is formed from the opening 182F1 and partitioning walls 182F2, i.e., the holding portion 181F has an opening 182F1 and partitioning walls 182F2. The opening 182F1 is formed on the plate 182F, and the partitioning walls 182F2 define the left and right boundaries of the holding portion 181F. In this structure, the lower end of each of the partitioning walls 182F2 can be set to be in contact with the plate 183F to form a reliable support between the plate 182F and the plate 183F and improve the strength of the base plate 18F in the up and down directions. Likewise, an opening (not shown) is provided through the lower plate 183F, and partitioning walls extending upward are provided on the left and right edges of the opening, so that the holding portion is formed by the opening and the partitioning walls.

Alternatively, the lower end of the partitioning walls 182F2 may not be in contact with the plate 183F, and when the base plate 18F is subjected to a force in the up and down directions, the partitioning walls 182F2 support the plate 183F, thereby improving the strength of the base plate 18F.

In addition, the structure of FIG. 31f can be seen to be obtained by omitting the bottom wall of the holding portion 181E in FIG. 31e.

Compared with structure in FIGS. 31*a* and 31*b*, the structure shown in FIGS. 31*d* to 31*f* can achieve a technical effect of reducing the weight of the base plate while taking into account the strength of the base plate.

A method of assembling the battery pack of the embodiment shown in FIGS. 2 to 29 is described below.

The assembly method comprises the following steps:

S1, fixing the battery module 20 to the base plate 11;

S2, fixing the high-voltage harness 51, the low-voltage harness 61 and the control device 41 to the high-voltage harness bracket 112, thereby forming a single unit (referred to as a first assembly);

S3, fixing the first assembly to the base plate 11; and

S4, fixing the upper cover 13 relative to the base plate 11 to form the battery pack 100.

Using the method as described above, the high-voltage harness 51, the low-voltage harness 61 and the control device 41 are fixed to the high-voltage harness bracket 112 and treated together as the first assembly, thereby making the battery pack 100 easy and convenient to assemble.

The order of S1 and S2 mentioned above is not limited. S1 can be executed first and S2 can be executed later. They can also be executed in reverse.

Optionally, said S2 comprises: fixing the control device 41 to the high-voltage harness bracket 112 via the control device bracket 42; and fixing the low-voltage harness 61 to the high-voltage harness bracket 112 via the low-voltage harness bracket 62.

The control device 41 may be mounted first on the control device bracket 42 and then on the high-voltage harness bracket 112, or the control device 41 bracket may be mounted first on the high-voltage harness bracket 112 and then on the control device 41. The same applies to the low-voltage harness 61 and the low-voltage harness bracket 62.

Embodiments of the present invention provide a battery pack 100 and a vehicle 200 having the battery pack 100. The battery pack 100 comprises: a housing 10 comprising a base plate 11 with a holding portion 113 in the base plate 11; a battery module 20 arranged above the base plate 11; and a high voltage connection component 50 which is electrically connected to the battery module 20 and is housed in the holding portion 113.

The power distribution device 31 is electrically connected to the connector 52 and the plurality of battery modules 20 and electrically connected to the connector 53 and the plurality of battery modules 20. The power distribution device 31 is disposed above a single battery module 20 and disposed closer to the connector 53 at the rear than to the connector 52 at the front.

Further, the battery module 20 comprises left side battery modules 20L and right side battery modules 20R, with a gap S between the left side battery modules 20L and the right side battery modules 20R. The control device 41 is provided in the gap S. The low-voltage connection component 60, which is electrically connected to the battery modules 20L and 20R and the control device 41, is also provided in the gap S. The low-voltage connection component 60 is located between the control device 41 and the battery modules 20R and is located below (i.e., diagonally below) the control device 41.

In addition, a reinforcing component 70 is provided above the base plate 11, and extends in the left and right directions as a whole. The reinforcing component 70 comprises a reinforcing member 72, a first connection component 71 and a second connection component 73. The reinforcing member 72 comprises an arch portion 72*a*, which is set in the gap S and arched upward, and the low-voltage connection component 60 passes through the inner side of the arch portion 72*a*. One end of each of the first connection component 71 and the second connection component 73 is connected to the reinforcing member 72, and the other end of each may be connected to the side plate 12 of the housing 10.

With the structure of the present embodiment, for example, when the vehicle is subjected to a lateral collision, the battery pack 100 is deformed and the battery module 20 moves in the extending direction of the base plate 11, however, since the high-voltage connection component 50 is configured in the base plate 11 below the battery module 20, the battery module 20 is unlikely to hit the high-voltage connection component 50, and thereby suppressing deformation, breakage, etc. of the high-voltage connection component 50 are suppressed. Thus, the safety and reliability of the battery pack 100 are improved.

In addition, setting the power distribution device 31 above the single-side battery module 20 not only improves the convenience of installation of the power distribution device 31, but also improves the stability of the power distribution device 31, and reduces the overall space occupied by the power distribution device 31 and improves the energy density of the battery pack 100 (the middle gap is not occupied, which minimizes the width of the battery pack).

Further, the power distribution unit 31 is set close to the connector 53, which can reduce the wire length of the high-voltage connection component 50 and reduce the cost. In addition, the power distribution device 31 is set close to the connector 53 at the rear of the battery pack, so that the front portion of the housing 10 of the battery pack does not need to be provided with a raised portion to accommodate the power distribution device 31, which in turn allows more space in the cabin corresponding to the location of the battery pack to accommodate the feet of passengers.

Also, setting the control device 41 vertically in the gap S makes reasonable use of the space of the housing 10, reduces the overall space occupied by the control device 41 in the battery pack 100, improves the energy density of the battery pack 100, and also facilitates assembly.

In addition, the reinforcing component 70 can improve the strength of the housing 10 of the battery pack 100, and the arch portion 72*a* can inhibit the reduction of the strength of the reinforcing component 70, spread the force effectively, and better deform and buffer when the battery pack 100 is impacted.

The terms "first, second, third, etc." or module A, module B, module C, and similar terms herein are used only to distinguish similar objects and do not represent a specific ordering of objects, and it is understood that specific orders or sequences may be interchanged where permitted so that embodiments of the present application described herein can be implemented in an order other than that illustrated or described herein.

The term "comprises" as used herein should not be construed as limiting to what is listed thereafter, and it does not exclude other components or steps. Accordingly, it should be interpreted as designating the presence of said feature, whole, step, or component mentioned, but does not preclude the presence or addition of one or more other features, whole, steps, or components and groups thereof. Thus, the expression "apparatus comprising apparatus A and B" should not be limited to an apparatus comprising only parts A and B.

References in this specification to "an embodiment" or "embodiments" mean that the particular feature, structure or characteristic described in conjunction with that embodiment is included in at least one embodiment of the present invention. Thus, the terms "in one embodiment" or "in an embodiment" appearing throughout this specification do not necessarily refer to the same embodiment, but may refer to the same embodiment. In addition, in one or more embodiments, the particular features, structures, or characteristics can be combined in any suitable manner, as would be apparent from the present disclosure to one of ordinary skill in the art.

Further, the foregoing is only a preferred embodiment of the present application and the technical principles employed. It will be understood by those of skill in the art that the present invention is not limited to the particular embodiments described herein, but is capable of various obvious variations, readjustments, and substitutions without departing from the scope of protection of the present invention. Therefore, although the present application is described in some detail by the above embodiments, the present invention is not limited to the above embodiments, but may include more other equivalent embodiments without departing from the conception of the present invention, all of which fall within the scope of protection of the present invention.

What is claimed is:

1. A battery pack comprising:
a housing provided with a first connector and a second connector at a front end and a rear end, respectively;
a battery module, arranged in said housing, comprising a first battery module and a second battery module, said first battery module and said second battery module being configured with a gap between them; and
a power distribution device electrically connected to said first connector and said battery module, electrically connected to said second connector and said battery module, arranged above said first battery module or said second battery module, and closer to said second connector than said first connector.

2. The battery pack according to claim 1,
wherein said power distribution device is fixed to said first battery module or said second battery module through a power distribution device bracket.

3. The battery pack according to claim 2,
wherein said power distribution device bracket comprises a top part and a side part, and said side part is bent from the edge of said top, and
said top part and said side part are respectively fit with an upper surface and a side surface of one of said first battery module or said second battery module.

4. The battery pack according to claim 2,
wherein said power distribution device bracket has a first mounting hole,
said battery module has a second mounting hole, and
said first mounting hole and said second mounting hole are sequentially threaded by a first bolt, so that said power distribution device bracket and said battery module are fixed on the housing.

5. The battery pack according to claim 3,
wherein the upper surface of said top part is fixed with a second bolt, and said power distribution device is installed on said power distribution device bracket through said second bolt.

6. The battery pack according to claim 1,
wherein said first battery module and said second battery module are connected in series and electrically connected to said power distribution device,
said power distribution device is equipped with a first wiring terminal and a second wiring terminal,
said first wiring terminal is electrically connected with said first connector through a first high-voltage connection component, and
said second wiring terminal is electrically connected with said second connector through a second high-voltage connection component.

7. The battery pack according to claim 1,
wherein said first battery module comprises a plurality of first battery modules and the second battery module comprises a plurality of second battery modules, said power distribution device is installed on a single first battery module of the plurality of first battery modules or a single second battery module of the plurality of second battery modules closest to said connector.

8. The battery pack according to claim 7,
wherein said battery pack further comprises a low-voltage connection component electrically connected with said battery module, and said low-voltage connection component is configured in said gap.

9. A vehicle comprising a first motor, a second motor and a battery pack according to claim 1, wherein:
said first motor is configured in front of said battery pack and electrically connected to said first connector,
said second motor is configured behind said battery pack and electrically connected to said second connector, and
said second connector is arranged at the rear end of the housing.

* * * * *